US011882599B2

(12) United States Patent
Uhling et al.

(10) Patent No.: US 11,882,599 B2
(45) Date of Patent: Jan. 23, 2024

(54) RESOLVING BEACON TRANSMISSION AND RECEIPT CONFLICTS IN MESH NETWORK NODES

(71) Applicant: ITRON, INC., Liberty Lake, WA (US)

(72) Inventors: Thomas F. Uhling, Spokane Valley, WA (US); Keith Wayne Barnes, Waseca, MN (US); Howard Neal Brace, Waseca, MN (US); Imad Jamil, Beynes (FR)

(73) Assignee: ITRON, INC., Liberty Lake, WA (US)

( * ) Notice: Subject to any disclaimer, the term of this patent is extended or adjusted under 35 U.S.C. 154(b) by 266 days.

(21) Appl. No.: 17/325,878

(22) Filed: May 20, 2021

(65) Prior Publication Data

US 2022/0377793 A1 Nov. 24, 2022

(51) Int. Cl.
*H04W 72/12* (2023.01)
*H04W 74/08* (2009.01)
*H04W 40/24* (2009.01)
*H04W 56/00* (2009.01)
*H04W 72/0446* (2023.01)
(Continued)

(52) U.S. Cl.
CPC ..... *H04W 74/0816* (2013.01); *H04W 40/244* (2013.01); *H04W 56/001* (2013.01); *H04W 72/0446* (2013.01); *H04W 72/1263* (2013.01); *H04W 84/18* (2013.01)

(58) Field of Classification Search
None
See application file for complete search history.

(56) References Cited

U.S. PATENT DOCUMENTS

| 11,540,204 B1 * | 12/2022 | Ahmed | H04L 41/5003 |
| 2009/0167291 A1 * | 7/2009 | Richeson | G01D 4/004 |
| | | | 324/107 |

(Continued)

FOREIGN PATENT DOCUMENTS

| EP | 2 181 556 A2 | 5/2010 |
| WO | 2009/024950 A2 | 2/2009 |
| WO | 2009/024950 A3 | 5/2009 |

OTHER PUBLICATIONS

Extended European Search Report for Application No. 22171796.0 dated Oct. 17, 2022.

(Continued)

*Primary Examiner* — Brandon M Renner
(74) *Attorney, Agent, or Firm* — Artegis Law Group, LLP

(57) ABSTRACT

One embodiment of the present invention sets forth a technique for performing time synchronization within a network. The technique includes detecting a first scheduling conflict between a first transmission time associated with a first periodic beacon from a first node in the network and a first listening window associated with receiving a second periodic beacon from a second node in the network. The technique also includes determining a first alternate transmission time for the second periodic beacon based on a second transmission time associated with the second periodic beacon and a position of the second node in the network and calculating a second listening window associated with transmission of the second periodic beacon from the second node at the first alternate transmission time. The technique further includes listening for the second periodic beacon during the second listening window.

20 Claims, 12 Drawing Sheets

(51) Int. Cl.
*H04W 72/1263* (2023.01)
*H04W 84/18* (2009.01)

(56) References Cited

U.S. PATENT DOCUMENTS

| | | |
|---|---|---|
| 2009/0323565 A1 | 12/2009 | Funakubo et al. |
| 2010/0085930 A1 | 4/2010 | Shin et al. |
| 2010/0111048 A1* | 5/2010 | Shim .................... H04W 74/04 370/336 |
| 2014/0080491 A1* | 3/2014 | Tinnakornsrisuphap .................... H04W 72/541 455/438 |
| 2015/0006633 A1 | 1/2015 | Vandwalle et al. |
| 2015/0109981 A1 | 4/2015 | Patil et al. |
| 2016/0073429 A1* | 3/2016 | Oteri .................... H04W 24/02 370/338 |
| 2018/0084531 A1* | 3/2018 | Soman ................. H04W 76/16 |
| 2018/0263007 A1 | 9/2018 | Poorrezaei |
| 2021/0067942 A1* | 3/2021 | Monier ................. H04L 47/283 |
| 2021/0235172 A1* | 7/2021 | Wohlschlager .......... H04Q 9/00 |
| 2022/0377753 A1* | 11/2022 | Uhling ................. H04W 72/12 |

OTHER PUBLICATIONS

Extended European Search Report for Application No. 22171773.9 dated Oct. 20, 2022.
Non Final Office Action received for U.S. Appl. No. 17/325,868 dated Jun. 22, 2023, 15 pages.
Notice of Allowance received for U.S. Appl. No. 17/325,868 dated Nov. 3, 2023, 17 pages.

* cited by examiner

RESOLVING BEACON TRANSMISSION AND RECEIPT CONFLICTS IN MESH NETWORK NODES

BACKGROUND

Field of the Various Embodiments

Embodiments of the present disclosure relate generally to computer science and networking, and more specifically, to resolving beacon transmission and receipt conflicts in mesh network nodes.

Description of the Related Art

A conventional utility distribution infrastructure typically includes multiple consumers (e.g., houses, business, etc.) coupled to a set of intermediate distribution entities. The distribution entities draw resources from upstream providers and distribute the resources to the downstream consumers. In a modern utility distribution infrastructure, the consumers and/or intermediate distribution entities may include Internet-of-Things (IoT) devices, such as smart utility meters and other network-capable hardware. These IoT devices can include battery-powered devices (BPDs) that draw power from an internal battery and/or mains-powered devices (MPDs) that draw power from mains electricity, a power grid, and/or another external power source. Among other things, these IoT devices measure the consumption levels of various resources to generate related metrology data and periodically report the metrology data across the Internet and/or other networks to a centralized management facility, often referred to as the "back office."

In many cases, the back office performs various management operations for the utility distribution infrastructure on behalf of one or more customers. For example, a customer could include a utility company or another corporate entity that owns and/or operates all of or part of the utility distribution infrastructure. Typically, the back office periodically collects metrology data associated with the utility distribution infrastructure and provides that data to customers. For example, the back office could obtain metrology data from a set of IoT devices every eight hours indicating utility consumption over an eight-hour interval. The back office also occasionally initiates on-demand read requests to read metrology data from one or more specific IoT device at the behest of the customer. For example, the customer could require a final utility meter reading from a smart utility meter located at a recently sold residence to prorate a utility bill. In such a situation, the back office would transmit an on-demand read request to that smart meter to cause the smart meter to report the current meter reading.

In some implementations, instead of communicating with one another indirectly through the back office, a group of IoT devices may establish an ad hoc mesh network to enable more direct device-to-device communications. Such a mesh network is typically formed by establishing communication links between pairs of IoT devices that reside relatively close to one another. The IoT devices then use the communication links within the mesh network to exchange and/or aggregate metrology data, propagate commands, and/or participate in other decisions or actions.

To reduce power consumption in BPDs within the mesh network, a given device may transmit and receive messages with neighboring devices in the mesh network on a periodic basis with a low duty cycle. For example, a given node in the mesh network could periodically (e.g., once a minute to once every few minutes) turn on a radio receiver for a short duration (e.g., a given number of milliseconds) to listen for messages from a neighboring node in the mesh network. The node also could periodically turn on a radio transmitter for a short duration to transmit messages to a neighboring node in the mesh network. To ensure that messages are successfully transmitted and received among the different nodes in the mesh network, each node typically maintains a schedule of times to listen for messages from individual neighboring nodes as well as times at which the node is permitted to transmit messages to individual neighboring nodes. Because a given node listens for messages from a neighboring node for only a short period of time, accurate time synchronization among the different nodes in the mesh network is desirable to ensure that the nodes are capable of communicating with one another on a consistent basis over time.

One approach to performing time synchronization between nodes in a mesh network involves organizing the nodes under one or more tree-based hierarchies, where each tree-based hierarchy includes multiple levels of descendant nodes organized under a root node. Within the hierarchy, a given parent node at a first level of the hierarchy periodically transmits timing messages to one or more child nodes at a second level of the hierarchy that is below the first level, and each child node uses timing information included in the timing messages to track time in accordance with the parent node. When the timing of a child node diverges from the timing of the parent node (e.g., due to temperature fluctuations or other environmental factors), the child node adjusts an internal clock to realign the timing of the child node with that of the parent node. Thus, a given node in the hierarchy tracks the timing of the root node via timing messages transmitted along a chain of parent-child connections between the root node and the node.

One drawback of the time synchronization approach described above is that timing errors and delays in time synchronization between a node and the root node in a tree-based hierarchy increase as the hop count between the node and the root node increases. In that regard, a first node that is a child of the root node the tree-based hierarchy adjusts an internal clock to match the timing of the root node. A second node that is a child of the first node is not aware of the adjustment to the timing of the first node until the second node receives a subsequent timing message from the first node. The second node then makes a corresponding adjustment to an internal clock to match the timing of the first node. In turn, a third node that is a child of the second node is not notified of the adjustment to the timing of the second node until the third node receives a subsequent timing message from the second node. Consequently, the third node experiences a greater delay in receiving an update to the timing at the root node than the first and second nodes. Further, because the third node indirectly receives timing information from the root node via a chain of timing messages that include timing information (and corresponding timing errors) from the first and second nodes, the third node experiences a greater timing error with the root node than the first and second nodes.

To account for the types of timing errors and timing synchronization delays described above, a non-root node in the hierarchy can increase the listening period over which that node listens for timing messages from a parent node in the hierarchy. This increased listening period allows the non-root node to "catch" the timing messages, even when the timing messages are transmitted according to an internal clock on the parent node that has "jumped" to align with the timing of the root node. However, increasing the listening period of a node consumes additional power, which can reduce the overall battery life of a BPD. On the other hand, if a node in the hierarchy fails to receive timing messages from the other nodes in the hierarchy, then the node can lose time synchronization with the root node and/or other higher-level nodes in the hierarchy. If time synchronization within the hierarchy is lost, then different nodes in the hierarchy cannot reliably communicate with one another. Accordingly, the nodes in the hierarchy must perform a lengthy and computationally expensive discovery process to reestablish time synchronization for the network to operate properly.

As the foregoing illustrates, what is needed in the art are more effective techniques for performing time synchronization across the nodes of a network.

SUMMARY

One embodiment of the present invention sets forth a technique for performing time synchronization within a network. The technique includes detecting a first scheduling conflict between a first transmission time associated with a first periodic beacon from a first node in the network and a first listening window associated with receiving a second periodic beacon from a second node in the network. The technique also includes determining a first alternate transmission time for the second periodic beacon based on a second transmission time associated with the second periodic beacon and a position of the second node in the network and calculating a second listening window associated with transmission of the second periodic beacon from the second node at the first alternate transmission time. The technique further includes listening for the second periodic beacon during the second listening window.

One technical advantage of the disclosed techniques relative to the prior art is that, with the disclosed techniques, a given node within a network can maintain time synchronization with the other nodes within the network without having to match the local timing of any of the other nodes. Accordingly, with the disclosed techniques, a node in a network is able to avoid the accumulation and magnification of timing errors and time synchronization delays that result from the node changing an internal clock to match the local timing of a root node in the network via timing messages transmitted along a path from the root node to the node. Another technical advantage is that the disclosed techniques enable a given node within a network to perform time synchronization operations with neighboring nodes within the network using a relatively shorter listening window. Accordingly, the disclosed techniques reduce power consumption and resource overhead for a node relative to conventional approaches that require a node to implement an extended listening window to receive timing messages from the other nodes within a network. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
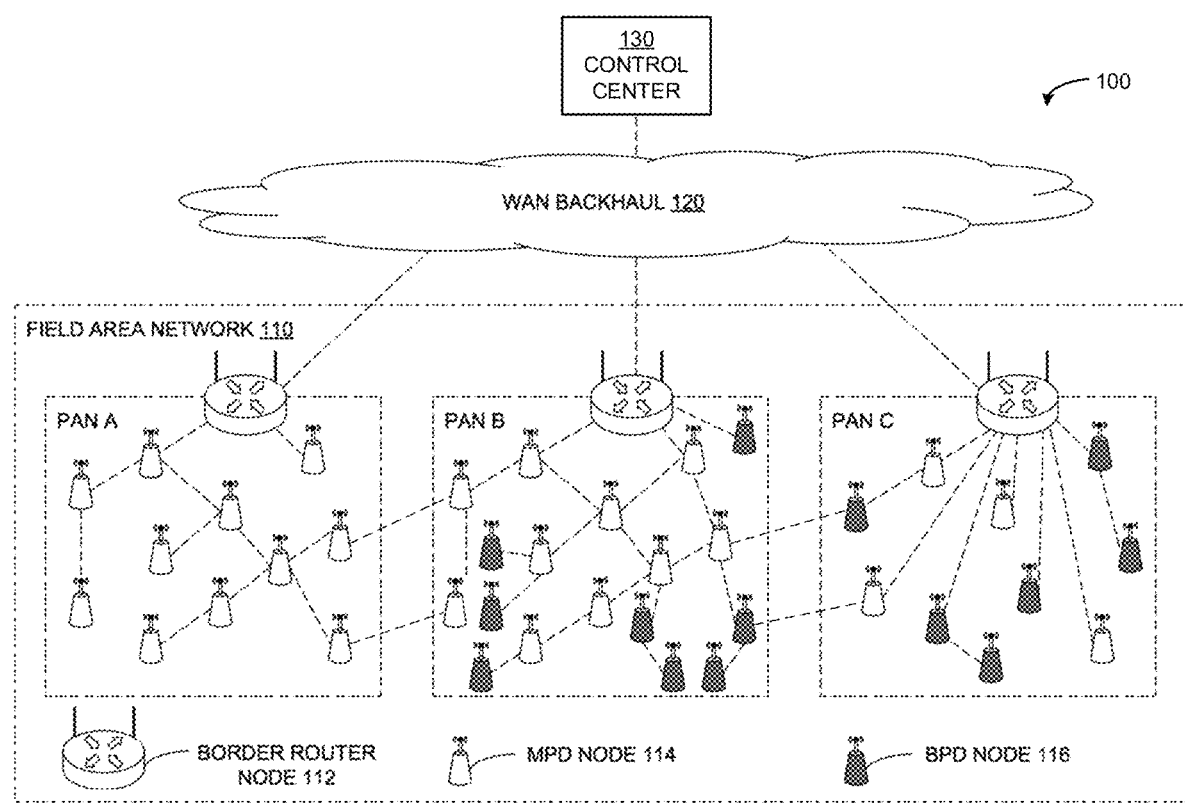
FIG. 1 is a conceptual illustration of a network system configured to implement one or more aspects of various embodiments.

FIG. 1 is a conceptual illustration of a network system 100 configured to implement one or more aspects of various embodiments. As shown, network system 100 includes a field area network (FAN) 110, a wide area network (WAN) backhaul 120, and a control center 130. FAN 110 is coupled to control center 130 via WAN backhaul 120. Control center 130 is configured to coordinate the operation of FAN 110.

FAN 110 includes personal area network (PANs) A, B, and C. PANs A and B are organized according to a mesh network topology, while PAN C is organized according to a star network topology. It will be appreciated that PANs A, B, or C can be organized according to other network topologies or structures. For example, one or more PANs could be configured in a tree-like network structure, such as a Destination Oriented Directed Acyclic Graph (DODAG) with parent nodes, child nodes, and a root node.

Each of PANs A, B, and C includes at least one border router node 112 and one or more mains powered device (MPD) nodes 114. PANs B and C further include one or more battery powered device (BPD) nodes 116.

MPD nodes 114 draw power from an external power source, such as mains electricity or a power grid. MPD nodes 114 typically operate on a continuous basis without powering down for extended periods of time. BPD nodes 116 draw power from an internal power source, such as a battery. BPD nodes 116 typically operate intermittently and power down for extended periods of time in order to conserve battery power. MPD nodes 114 and BPD nodes 116 are configured to gather sensor data, process the sensor data, and communicate data processing results and other information to control center 130. Border router nodes 112 operate as access points to provide MPD nodes 114 and BPD nodes 116 with access to control center 130.

Nodes may transmit data packets across a given PAN and across WAN backhaul 120 to control center 130. Similarly, control center 130 may transmit data packets across WAN backhaul 120 and across any given PAN to a particular node included therein. As a general matter, numerous routes may exist which traverse any of PANs A, B, and C and include any number of intermediate nodes, thereby allowing any given node or other component within network system 100 to communicate with any other node or component included therein. However, these routes are generally not known by the nodes unless a dedicated protocol is implemented by the nodes, in addition to the protocol used to manage each PAN. Conversely, routes that link nodes within a given PAN are typically known (e.g., via the protocol used to manage the PAN) by the nodes in the PAN and allow nodes within the PAN to communicate with one another.

Control center 130 includes one or more server machines (not shown) configured to operate as sources for, or destinations of, data packets that traverse within network system 100. The server machines may query nodes within network system 100 to obtain various data, including raw or processed sensor data, power consumption data, node/network throughput data, status information, and so forth. The server machines may also transmit commands and/or program instructions to any node within network system 100 to cause those nodes to perform various operations. In one embodiment, each server machine is a computing device configured to execute, via a processor, a software application stored in a memory to perform various network management operations.

Any of border router nodes 112, MPD nodes 114, and BPD nodes 116 additionally include functionality to communicate directly with one or more adjacent nodes via bi-directional communication links. The communication links may be wired or wireless links, although in practice, adjacent nodes of a given PAN or across multiple PANs exchange data with one another by transmitting data packets via wireless radio frequency (RF) communications.

Each node within a given PAN may implement a discovery protocol to identify one or more adjacent nodes, or "neighbors." A node that has identified a spatially adjacent, neighboring node may establish a bi-directional communication link with the neighboring node. For example, a node that has discovered another node could exchange media access control (MAC) addresses and schedule future communications with the other node based on those MAC addresses. Each neighboring node could update a respective neighbor table to include information concerning the other node, including the MAC address of the other node as well as a received signal strength indication (RSSI) of the communication link established with that node.

In one embodiment, nodes may implement the discovery protocol to determine the hopping sequences of adjacent nodes. The hopping sequence of a node is the sequence of RF channels across which the node periodically receives data. As is known in the art, a channel may correspond to a particular range of frequencies.

Once adjacency is established between nodes, any of those nodes can communicate with any of the other nodes via one or more intermediate nodes and one or more communications links associated with the intermediate node (s). In other words, communication links between adjacent nodes that have discovered one another may be used by the nodes to form a mesh network, independent of network topologies or structures associated with individual PANs A, B, or C. Nodes in the mesh network may additionally communicate with one another via the communication links in the mesh network instead of relying on the network structures and/or connections in WAN backhaul 120 or PANs A, B, or C. For example, communications links established between one or more nodes in PAN A and one or more nodes in PAN B, and between one or more nodes in PAN B and one or more nodes in PAN C, could be used to transmit Internet protocol (IP) packets, command messages, metrology data, and/or other technically feasible data units between or among nodes in the mesh network without routing the data through WAN backhaul 120.

Any of the nodes discussed above may operate as a source node, an intermediate node, or a destination node for the transmission of data packets. A given source node may generate a data packet and then transmit the data packet to a destination node via any number of intermediate nodes (in mesh network topologies). The data packet may indicate a destination for the packet and/or a particular sequence of intermediate nodes to traverse to reach the destination node. In one embodiment, each intermediate node may include a forwarding database indicating various network routes and cost metrics associated with each route.

Figure 2:
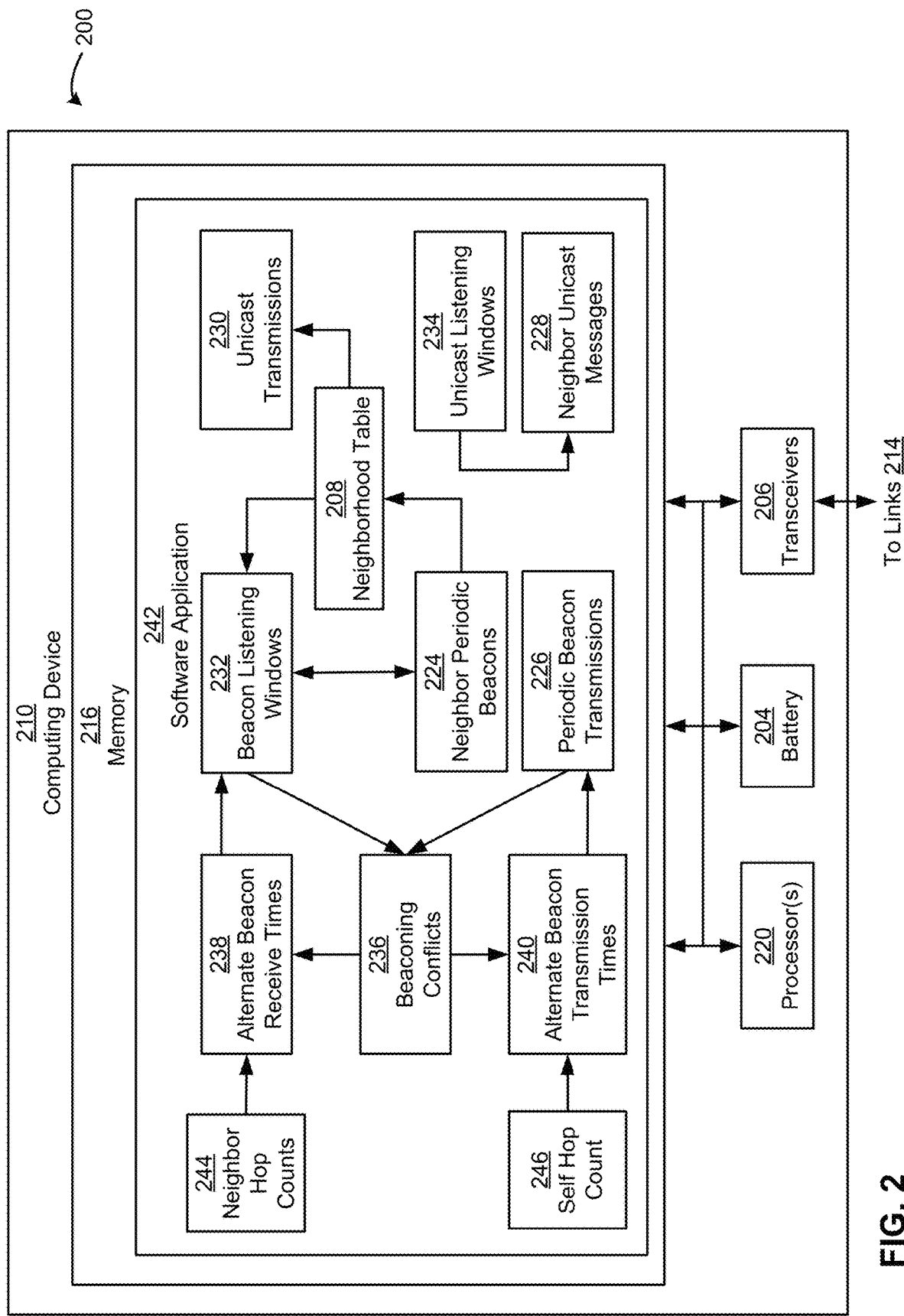
FIG. 2 is a conceptual illustration of a node configured to transmit and receive data within the network system of FIG. 1, according to various embodiments.

Nodes may include computing device hardware configured to perform processing operations and execute program code. Each node may further include various analog-to-digital and digital-to-analog converters, digital signal processors (DSPs), harmonic oscillators, transceivers, and any other components generally associated with RF-based communication hardware. FIG. 2 illustrates an exemplary node that may operate within the network system 100.

FIG. 2 is a conceptual illustration of a node 200 configured to transmit and receive data within network system 100 of FIG. 1, according to various embodiments. Node 200 may be used to implement any of border router nodes 112, MPD nodes 114, and BPD nodes 116 of FIG. 1.

As shown, node 200 includes a computing device 210. Computing device 210 includes one or more processors 220, a battery 204, one or more transceivers 206, and a memory 216 coupled together. Processors 220 may include any hardware configured to process data and execute software applications. For example, processors 220 could include one or more central processing units (CPUs), graphics processing units (CPUs), application-specific integrated circuit (ASICs), field programmable gate array (FPGAs), artificial intelligence (AI) accelerators, microprocessors, microcontrollers, other types of processing units, and/or a combination of different processing units (e.g., a CPU configured to operate in conjunction with a GPU).

Transceivers 206 are configured to transmit and receive data packets across network system 100 using a range of channels and power levels. Each transceiver includes one or more radios implemented in hardware and/or software to provide two-way RF communication with other nodes in network system 100 via one or more communications links 214. Transceivers 206 may also, or instead, include a cellular modem that is used to transmit and receive data with a cellular base station via a corresponding link.

Battery 204 supplies power to processors 220, transceivers 206, memory 216, and/or other components of computing device 210. For example, battery 204 could include sufficient capacity to allow computing device 210 to operate for a number of years without replacement and/or recharging. In some embodiments, power from battery 204 is supplemented with or replaced by a mains power supply, a solar panel, and/or another power source.

Memory 216 includes one or more units that store data and/or instructions. For example, memory 216 could include a random access memory (RAM) module, a flash memory unit, and/or another type of memory unit. Processors 220, transceivers 206, and/or other components of node 200 include functionality to read data from and write data to memory 216. Memory 216 includes software application 242, which includes program code that, when executed by one or more processors 220, performs any of the operations discussed herein.

In operation, software application 242 use transceivers 206 and links 214 to transmit and receive periodic beacons with neighboring nodes in network system 100. These periodic beacons include timing information that allows computing device 210 to perform time synchronization with the neighboring nodes. Software application 242 also transmits and receives unicast messages with the neighboring nodes to exchange and/or aggregate metrology data, propagate commands, and/or perform other types of actions.

In one or more embodiments, software application 242 includes functionality to manage the transmission and receipt of periodic beacons with neighboring nodes in a way that maintains accurate time synchronization with the neighboring nodes. As discussed in further detail below, this time synchronization further allows node 200 to exchange periodic beacons and unicast messages with the neighboring nodes over short transmission and listening periods. Node 200 can also turn off transceivers 206 outside of the transmission and listening periods, thereby reducing power consumption and conserving battery 204 life in node 200.

Time Synchronization in a Mesh Network

As mentioned above, software application 242 is configured to use periodic beacons to perform time synchronization with neighboring nodes in network system 100. More specifically, software application 242 maintains a local network time on computing device 210 that is independent of the local network times maintained by other nodes in network system 100. Software application 242 also sends and receives periodic beacons with neighboring nodes in network system 100. Timing information provided by the periodic beacons allows each node in network system 100 to both communicate the local network time on the node to neighboring nodes and track the local network times on the neighboring nodes.

In one or more embodiments, software application 242 running on a given node 200 in network system 100 performs periodic beacon transmissions 226 over transceivers 206. Periodic beacon transmissions 226 include broadcasting of periodic beacons from a given node 200 to neighboring nodes in network system 100. These periodic beacons include timing information that allows the neighboring nodes to perform time synchronization with one another. For example, each periodic beacon broadcasted by software application 242 could include a unique identifier (e.g., a Media Access Control (MAC) address) for the corresponding node 200 and a current time slot number representing the local network time on node 200 at which the periodic beacon is transmitted. Each periodic beacon could additionally be transmitted at the beginning of the time slot represented by the time slot number.

Software application 242 additionally broadcasts periodic beacons at regular intervals to allow the neighboring nodes to track timing drift and/or timing errors at node 200. For example, software application 242 could perform periodic beacon transmissions 226 according to a beaconing interval that is defined as a certain number of time slots between consecutive periodic beacons. In this example, a time slot represents a fixed duration of time, such as a certain number of milliseconds. When the current time slot number modulo the beaconing interval equals a certain number (e.g., 0), software application 242 broadcasts a periodic beacon with the current time slot number on node 200 to neighboring nodes. During each of periodic beacon transmissions 226, software application 242 could determine the frequency and/or channel over which the corresponding periodic beacon is to be transmitted using the current time slot number, the MAC address of computing device 210, and/or the number of active channels in the mesh network.

Software application 242 also includes functionality to perform unicast transmissions 230 of messages to one or more neighboring nodes over transceivers 206. In some embodiments, a given node 200 performs unicast transmissions 230 to a neighboring node at regular intervals, which are different and/or offset from the regular intervals with which periodic beacons are broadcasted from the same node 200 to avoid between periodic beacon transmissions 226 and unicast transmissions 230. Continuing with the above example, software application 242 on node 200 could perform unicast transmissions 230 to a given neighboring node according to a unicast interval that is defined as a certain number of time slots between consecutive unicast transmissions 230 and is more frequent than the beaconing interval with which periodic beacon transmissions 226 are performed. When the current time slot number modulo the unicast interval equals a certain number, software application 242 selectively transmits a unicast message to a neighboring node to communicate data and/or information to the neighboring node. This unicast transmission could occur at a certain millisecond offset into the time slot to prevent conflicts with periodic beacon transmissions 226 that may occur in the beginning of the same time slot. This unicast transmission could also occur at a time at which the neighboring node is expected to listen for unicast messages, as described in further detail below.

After a unicast message is transmitted by a given node 200 to a neighboring node, the neighboring node can aggregate data in the unicast message with data from other unicast messages and/or propagate the data in additional unicast messages to other nodes. Unicast messages may thus be used by nodes in network system 100 to communicate with control center 130 and/or perform other tasks. For example, a given node 200 in network system 100 could transmit unicast messages that include metrology data such as meter readings to a parent node. The parent node could aggregate the metrology data from multiple child nodes into a single unicast message that is further relayed to a higher-level parent node. A designated node in network system 100 could receive the aggregated metrology data for multiple nodes and transmit the aggregated metrology data over a cellular link to a server and/or control center 130. The designated node could also receive on-demand requests from control center 130 for metrology and/or other types of data on specific target nodes in network system. These on-demand requests could then be communicated to the target nodes via unicast messages across a series of links 214 from the designated node to the target nodes.

Prior to sending and receiving periodic beacons and unicast messages with neighboring nodes, software application 242 may perform a discovery process with neighboring nodes in the mesh network. As described above, software application 242 may implement a discovery protocol to identify and establish mesh links 214 with the neighboring nodes. For example, software application 242 could broadcast a discovery beacon to the mesh network and/or receive discovery beacons from neighboring nodes to discover the neighboring nodes and establish links 214 with the neighboring nodes. These neighboring nodes can include parent nodes and/or child nodes of a given node 200 in the mesh network. Each discovery beacon from node 200 could include a unique identifier (e.g., a Media Access Control (MAC) address) for node 200, a time slot number representing the local network time at which the discovery beacon was transmitted, a beaconing interval representing the number of time slots between periodic beacons transmitted by node 200, and/or other timing information that can be used by to communicate and/or perform time synchronization with node 200.

After a discovery beacon is received by a given node 200 from a neighboring node, software application 242 updates a neighborhood table 208 with an entry that includes the timing information in the discovery beacon, a timestamp representing the time at which the discovery beacon was received, and/or other information that can be used to determine the local network time at the neighboring node. Software application 242 then uses the entry to determine future times at which the neighboring node will transmit periodic beacons and listen for unicast transmissions 230 from node 200.

More specifically, software application 242 uses timing information in neighborhood table 208 to determine beacon listening windows 232 for neighbor periodic beacons 224 from the neighboring nodes. As described in further detail below with respect to FIGS. 3-4, software application 242 estimates a receive time for a periodic beacon (which is directly related to and/or can represent a transmission time of the periodic beacon) from a neighboring node based on timing information for the neighboring node in neighborhood table 208 and calculates a beacon listening window for the next periodic beacon from the neighboring node by adding a timing uncertainty to each side of the receive time (e.g., before and after the receive time). The timing uncertainty can include a jitter uncertainty, drift uncertainty, and/or missed synchronization uncertainty.

During a given beacon listening window, software application 242 configures one or more transceivers 206 to listen for periodic beacons from a corresponding neighboring node. After a periodic beacon is received from the neighboring node, software application 242 updates the entry for the neighboring node in neighborhood table 208 with the timing information in the periodic beacon.

In other words, software application 242 uses the discovery process to identify neighboring nodes in network system 100 and receive initial timing information from the neighboring nodes. Software application 242 updates neighborhood table 208 with the timing information and uses neighborhood table 208 to determine beacon listening windows 232 for neighbor periodic beacons 224 from the same neighboring nodes. Software application 242 also receives neighbor periodic beacons 224 over the corresponding beacon listening windows 232 and updates neighborhood table 208 with timing information in the received neighbor periodic beacons 224. The updated timing information in neighborhood table 208 allows software application 242 to maintain an up-to-date view of the local network time on each neighboring node, which in turn allows software application 242 to accurately determine beacon listening windows 232 over which additional updates to the local network time on each neighboring node are received.

In one or more embodiments, software application 242 uses timing information in neighborhood table 208 to determine transmission times for unicast transmissions 230 to neighboring nodes. For example, software application 242 could calculate a current time slot number at a neighboring node based on the time slot number in the last periodic beacon from the neighboring node, the time elapsed since the last periodic beacon from the neighboring node, and a time slot duration. Software application 242 could calculate a next time slot number representing the next available transmission time of a unicast transmission to the neighboring node as a value that, when divided by a unicast interval representing a predefined number of time slots between consecutive unicast transmissions 230, produces a modulus that equals a certain number. Software application 242 could then determine the time corresponding to the next time slot number based on the time slot duration and the number of time slots between the current time slot number and the next time slot number. If software application 242 withes to communicate with the neighboring node, software application 242 could transmit a unicast message to the neighboring node at the beginning of the time corresponding to the next time slot number (or at a predefined offset into the time slot number).

Software application 242 additionally determines unicast listening windows 234 for neighbor unicast messages 228 from the neighboring nodes. As described in further detail below with respect to FIGS. 5 and 6B, software application 242 determines a time at which node 200 will listen for neighbor unicast messages 228 from one or more neighboring nodes based on the local network time on node 200 and the unicast interval and calculates a unicast listening window for neighbor unicast messages 228 by adding a drift uncertainty and/or jitter uncertainty to the receive time.

During a given unicast listening window, software application 242 configures one or more transceivers 206 to listen for one or more neighbor unicast messages 228 from one or more neighboring nodes. After a unicast message is received during the unicast listening window, software application 242 stores the data in the unicast message, aggregates the data with data received in unicast messages from the same neighboring node and/or other neighboring nodes, propagates the data to one or more upstream nodes via one or more unicast transmissions 230 to the upstream node(s), and/or performs other tasks using the data.

Those skilled in the art will appreciate that beaconing conflicts 236 can occur when neighbor periodic beacons 224 received by a given node 200 overlap with periodic beacon transmissions 226 by node 200. For example, timing drift in node 200 and/or a neighboring node could cause a periodic beacon transmission from node 200 to coincide with a corresponding neighbor periodic beacon from the neighboring node. Because transceivers 206 on a given node can be configured to only transmit or listen for periodic beacons at a given time, beaconing conflicts 236 between two nodes can cause a failure in one or both nodes to receive neighbor periodic beacons 224 from the other node(s). Beaconing conflicts 236 between two neighboring nodes in a mesh network are described in further detail below with respect to FIG. 7.

In one or more embodiments, software application 242 on a given node 200 addresses beaconing conflicts 236 by determining alternate beacon transmission times 240 for periodic beacon transmissions 226 from node 200. Each alternate beacon transmission time represents a time at which a periodic beacon from node 200 is to be transmitted, outside of the regular intervals at which periodic beacon transmissions 226 are normally performed. Software application 242 then performs periodic beacon transmissions 226 at both the regular intervals and at the determined alternate beacon transmission times 240. Periodic beacon transmissions 226 at the regular intervals can be received by neighboring nodes with which node 200 does not have beaconing conflicts 236, while periodic beacon transmissions 226 at alternate beacon transmission times 240 allow one or more neighboring nodes with which node 200 has beaconing conflicts 236 to receive updates to the local network time on node 200 outside of the regular intervals.

As shown, alternate beacon transmission times 240 are determined based on a self hop count 246 representing the number of hops between node 200 and a root node in network system 100. For example, software application 242 could determine an alternate beacon transmission time as a time slot number that is a numeric offset from the normal time slot at which a periodic beacon is normally transmitted from node 200. This numeric offset could be calculated as a function of self hop count 246 from node 200 to the root node.

Software application 242 on a given node 200 also initiates periodic beacon transmissions 226 at alternate beacon transmission times 240 after the interval between the regular transmission time of a periodic beacon from node 200 and the regular transmission time of a periodic beacon from a neighboring node falls below a threshold. As described in further detail below with respect to FIGS. 8-9, this threshold may be calculated based on time uncertainties in beacon listening windows 232 of both nodes and an overhead factor.

To ensure that additional neighbor periodic beacons 224 transmitted by neighboring nodes outside of the regular intervals are received during beaconing conflicts 236 with the neighboring node, software application 242 on a given node 200 also uses neighbor hop counts 244 representing numbers of hops between the neighboring nodes and the root node to determine alternate beacon receive times 238 for these neighbor periodic beacons 224 and adds beacon listening windows 232 around the determined alternate beacon receive times 238. As described in further detail below with respect to FIGS. 10-11, software application 242 may determine alternate beacon receive times 238 and beacon listening windows 232 for receiving neighbor periodic beacons 224 when the interval between the regular transmission time of a periodic beacon from node 200 and the regular transmission time of a periodic beacon from a neighboring node falls below a threshold that is lower than the threshold used to trigger periodic beacon transmissions 226 at alternate beacon transmission times 240 on node 200. Consequently, software application 242 on a given node 200 begins transmitting periodic beacons at alternate transmission times 240 before software application 242 on a neighboring node starts listening for the periodic beacons to ensure minimize disruptions to the neighboring node's ability to receive the periodic beacons during beaconing conflicts 236 with node 200.

Listening Windows for Periodic Beacons in a Mesh Network

Figure 3:
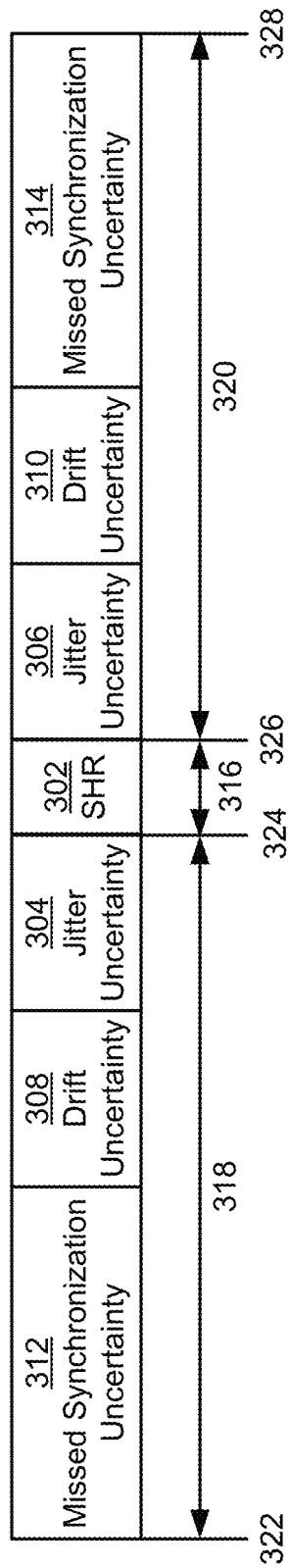
FIG. 3 illustrates the components of a beacon listening window over which the node of FIG. 2 listens for a periodic beacon from a neighboring node within a network, according to various embodiments.

FIG. 3 illustrates the components of a beacon listening window over which node 200 of FIG. 2 listens for a periodic beacon from a neighboring node within a network, according to various embodiments. As shown, the beacon listening window includes a first interval 316 that spans the duration over which a synchronization header (SHR) 302 for the periodic beacon is received. In some embodiments, SHR 302 includes a preamble and a start frame delimiter (SFD) for the periodic beacon.

Interval 316 is denoted by a start time 324 and an end time 326. Start time 324 is set to the estimated receive time of the periodic beacon, which is calculated using timing information for the neighboring node in neighborhood table 208 of node 200.

As described above, the timing information for the neighboring node in neighborhood table 208 is updated after a periodic beacon from the neighboring node is received by node 200. In some embodiments, software application 242 on node 200 updates this timing information by storing a timestamp representing the time at which receipt of the frame in the periodic beacon begins. Next, software application 242 subtracts the duration of the SHR (e.g., as represented by the length of interval 316) from this timestamp to determine the start time of the first bit of the preamble in the periodic beacon. The duration of the SHR may be calculated based on the preamble and SFD bit definitions for a given physical layer (PHY) mode associated with transmission of the periodic beacon. Software application 242 then updates an entry for the neighboring node in neighborhood table 208 with the start time of the first bit of the preamble and the time slot number in the periodic beacon.

Software application 242 on node 200 can then use the start time and time slot number in the entry for the neighboring node to estimate start time 324 for the next periodic beacon from the neighboring node. For example, software application 242 could calculate the neighboring node's current time slot number using the following equations:

TimeSinceReference=(CurrentTime−nhtTimeSlotStart)*(1−nhtPPMAdjust)     (1)

TimeSlotsSinceReference=floor(TimeSinceReference/TimeSlotDuration)     (2)

nhtCurrentSlotNumber=modulo((nhtTimeSlotNumber+TimeSlotsSinceReference), TimeSlotRollover)     (3)

In Equation 1, software application 242 calculates the time elapsed since the last periodic beacon was received from the neighboring node by subtracting the start time of the first bit of the preamble from the last periodic beacon (as represented by nhtTimeSlotStart) from the current time on node 200. Software application 242 also applies a correction factor represented by nhtPPMAdjust to the result to estimate the running time at the neighboring node. This correction factor can be calculated using a phase-locked loop (PLL) architecture, which includes a phase detector that calculates the error between the running time at node 200 and the running time at the neighboring node when a frame is received from the neighboring node. The PLL architecture also includes a proportional-plus-integral loop filter that filters the error and generates a value of by nhtPPMAdjust that can be applied to the running time at node 200 to correctly track the running time at the neighboring node. The proportional-plus-integral loop filter may be sampled after a periodic beacon is received from the neighboring node, and the value of nhtPPMAdjust generated from sampling of the loop filter may be stored in the entry for the neighboring node in neighborhood table 208 for subsequent use in Equation 1.

In Equation 2, software application 242 calculates the number of time slots that have elapsed since the last periodic beacon was received from the neighboring node by dividing the result of Equation 1 by a fixed time slot duration and applying a floor function to the result. In Equation 3, software application 242 calculates the current time slot number at the neighboring node as a sum of the time slot number at which the last periodic beacon was received (as represented by nhtTimeSlotNumber) and the result of Equation 2 modulo a numeric rollover for time slot numbers (as represented by TimeSlotRollover).

Continuing with the above example, software application 242 could then calculate the number of time slots to the next expected periodic beacon from the neighboring node (as represented by NumTSToNextPB) using the following equation:

$$NumTSToNextPB = BeaconInterval - modulo(nhtCurrentSlotNumber, BeaconInterval) \quad (4)$$

In Equation 4, BeaconInterval represents a predefined number of time slots between consecutive periodic beacons from the neighboring node.

Continuing with the above example, software application 242 could additionally calculate the time slot number of the next expected periodic beacon from the neighboring node (as represented by NextPBSlotNum) using the following equation:

$$NextPBSlotNum = modulo((nhtCurrentSlotNumber + NumTSToNextPB), TimeSlotRollover) \quad (5)$$

Finally, software application 242 could calculate the running time to the next periodic beacon from the neighboring node (as represented by RunningTimeNextPB) using the following equation:

$$RunningTimeNextPB = nhtTimeSlotStart + (modulo((NextPBSlotNum - nhtTimeSlotNumber + TimeSlotRollover), TimeSlotRollover)) * (TimeSlotDuration*(1-nhtPPMAdjust)) \quad (6)$$

After start time 324 of interval 316 is determined, software application 242 calculates end time 326 of interval 316 based on start time 324 and the estimated duration over which SHR 302 is received. For example, software application 242 could estimate the duration over which SHR 302 is received based on the preamble and SFD bit definitions for a given physical layer (PHY) mode associated with transmission of the periodic beacon. Software application 242 could then add the duration to start time 324 to obtain end time 326.

As shown in FIG. 3, the beacon listening window also includes two intervals 318-320 of equal length that immediately precede and follow interval 316, respectively. Each of intervals 318-320 represents a time uncertainty associated with receiving the periodic beacon at start time 324. Interval 318 includes a missed synchronization uncertainty 312, a drift uncertainty 308, and a jitter uncertainty 304. Interval 320 includes a missed synchronization uncertainty 314 that has the same length as missed synchronization uncertainty 312, a drift uncertainty 310 that has the same length as drift uncertainty 308, and a jitter uncertainty 306 that has the same length as jitter uncertainty 304.

Jitter uncertainties 304-306 account for timing jitter in both node 200 and the neighboring node. As a result, each jitter uncertainty may be calculated as a combination of the jitter uncertainty at node 200 and the jitter uncertainty at the neighboring node. For example, software application 242 could calculate the combined jitter uncertainty (as represented by JitterTimeUnc) using the following equation:

$$JitterTimeUnc = JitterMultiplier*(2*JitterTime) \quad (7)$$

In the above equation, each jitter uncertainty is calculated by doubling a jitter time (as represented by JitterTime) that is assumed to be the same for both nodes and scaling the result by a JitterMultiplier.

Drift uncertainties 308-310 account for anticipated drift caused by the error in the PLL loop that corrects for timing errors between node 200 and the neighboring node. In some embodiments, each drift uncertainty is calculated based on the elapsed time since the last time synchronization with the neighboring node and the output of the PLL loop. For example, software application 242 could calculate each drift uncertainty (as represented by DriftTimeUnc) using the following equations:

$$TimeDiffLastSync = Preamble\ Start\ Time - nhtLastSyncTime \quad (8)$$

$$DriftTimeUnc = abs(TimeDiffLastSync*nhtXdrift) \quad (9)$$

In Equation 8, PreambleStartTime represents start time 324, nhtLastSyncTime represents the time of the most recent synchronization with the neighboring node (e.g., the start time of the first bit of the preamble of the last periodic beacon from the neighboring node), and nhtXdrift is a drift component of the correction factor generated by the phase filter in the PLL loop. This drift component can be calculated using the following equations:

$$TimeErr = RunningTimeNextPB - nhtTimeSlotStart \quad (10)$$

$$TimeDiffLastSync = nhtTimeSlotStart - nhtLastSyncTime \quad (11)$$

$$nhtXdrift = TimeErr/TimeDiffLastSync \quad (12)$$

In Equation 10, TimeErr represents the start time of the timing error between node 200 and the neighboring node and is calculated as the difference between the value of RunningTimeNextPB at the time at which the periodic beacon was received and the actual time at which the periodic beacon was received. In Equation 10, TimeDiffLastSync represents the amount of time that has lapsed since the previous periodic beacon was received and is calculated as the difference between the time at which the periodic beacon was received and the time at which the previous beacon was received. In Equation 11, nhtXdrift is calculated as a ratio between TimeErr and TimeDiffLastSync.

Missed synchronization uncertainties 312-314 account for potential increases in timing errors due to missed periodic beacons from the neighboring node. Thus, missed synchronization uncertainties 312-314 are increased whenever node 200 misses a periodic beacon from the neighboring node. For example, software application 242 could calculate each missed synchronization uncertainty using the following equations:

$$NumMissedPB=floor((TimeDiffLastSync-DriftComp)/(BeaconInterval*TimeSlotDuration)) \quad (13)$$

$$MissedSyncUnc=NumMissedPB*MissedSyncUncAdder \quad (14)$$

In Equation 13, NumMissedPB represents the number of missed periodic beacons from the neighboring node since the most recent periodic beacon from the neighboring node, and DriftComp is a value that prevents NumMissedPB from erring on the high side because of drift errors that may affect the value of TimeDiffLastSync. In Equation 14, the missed synchronization uncertainty is represented by MissedSyncUnc and is calculated as a product of NumMissedPB and a fixed compensation factor represented by MissedSyncUncAdder.

After jitter uncertainties 304-306, drift uncertainties 308-310, and missed synchronization uncertainties 312-314 are calculated for a given periodic beacon, software application 242 determines the length of each interval 318 and 320 (as represented by TimeUncertainty) by summing the respective uncertainties and enforcing a fixed maximum time uncertainty (as represented by TimeUncertaintyMax) on the result:

$$SumUncertainty=JitterTimeUnc+DriftTimeUnc+MissedSyncUnc \quad (15)$$

$$TimeUncertainty=min(SumUncertainty,TimeUncertaintyMax) \quad (16)$$

This maximum time uncertainty prevents node 200 from consuming excessive battery 204 while listening for the periodic beacon, after multiple periodic beacons have been missed from the neighboring node.

After the duration of each of intervals 318-320 is calculated, software application 242 determines a listening start time 322 by subtracting the duration from start time 324 and determines a listening end time 328 by adding the duration to end time 326. Software application 242 then configures transceivers 206 to listen for a periodic beacon from the neighboring node beginning at listening start time 322 and ending at listening end time 328. If the preamble and SFD for the periodic beacon is received within the beacon listening window, software application 242 may continue listening beyond listening end time 328 to attempt to receive a frame for the periodic beacon.

Once SumUncertainty exceeds TimeUncertaintyMax, software application 242 may set each interval 318 and 320 to TimeUncertaintyMax until a periodic beacon from the neighboring node is received or a predefined timeout period has lapsed since the receipt of the last periodic beacon from the neighboring node. Once the predefined timeout period has lapsed, software application 242 may expand intervals 318-320 for the next beacon listening window to a "recovery time uncertainty" that is larger than TimeUncertaintyMax to try to recover from an unexpected time misalignment with the neighboring node. Software application 242 may perform a certain number of attempts at receiving a periodic beacon from the neighboring node using a listening window that includes the increased recovery time uncertainty. If software application 242 successfully receives a periodic beacon from the neighboring node within this number of attempts, software application 242 may revert to determining beacon listening windows for subsequent periodic beacons from the neighboring node using jitter uncertainties 304-306, drift uncertainties 308-310, and/or missed synchronization uncertainties 312-314. If software application 242 is unable to receive any periodic beacons from the neighboring node within this number of attempts, software application 242 may discontinue listening for periodic beacons from the neighboring node, remove an entry for the neighboring node from neighborhood table 208, log an event indicating a loss of timing synchronization with the neighboring node, and/or perform other actions to address the loss of timing synchronization with the neighboring node.

Figure 4:
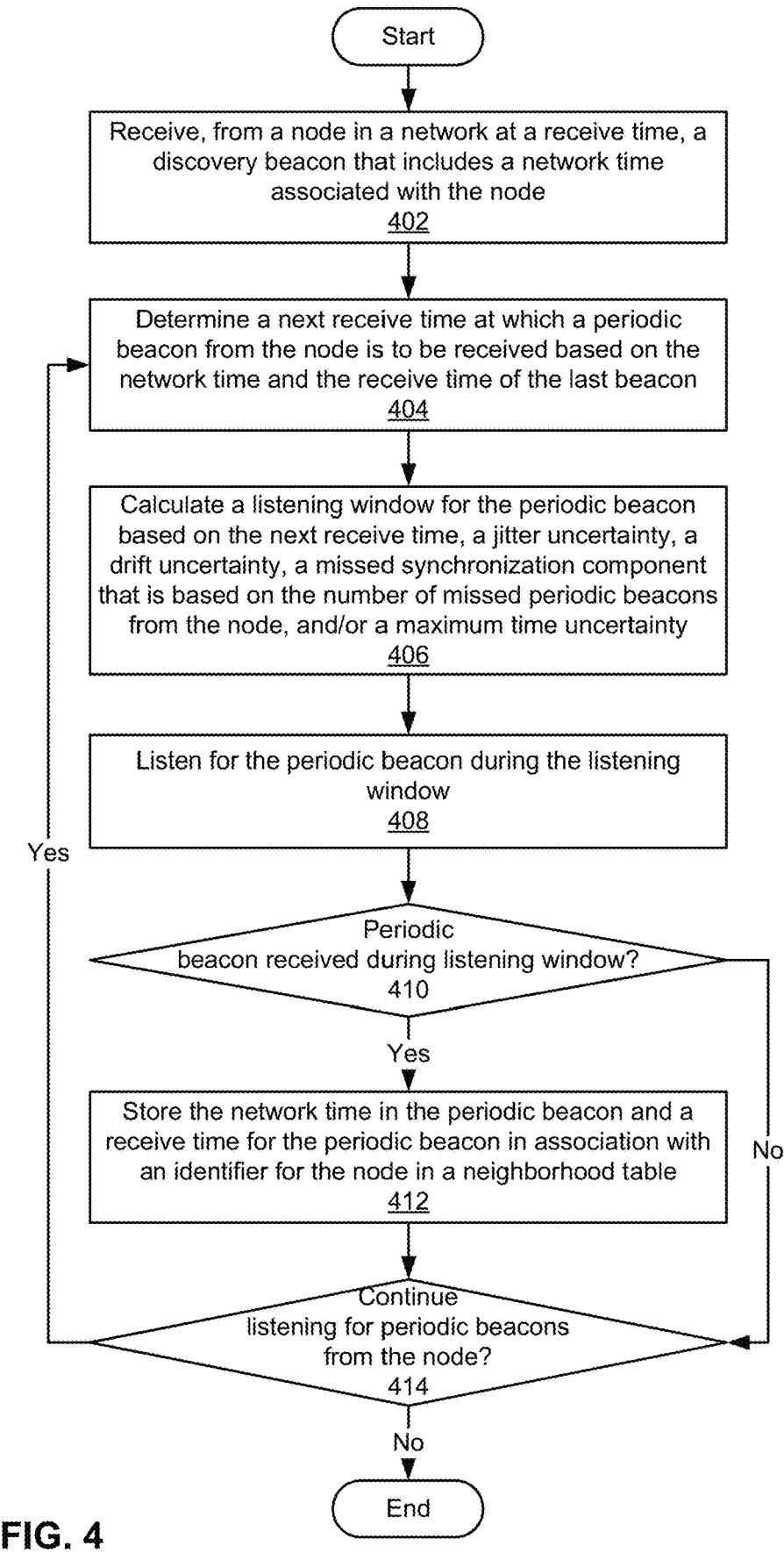
FIG. 4 sets forth a flow diagram of method steps for performing time synchronization with respect to a node within a network, according to various embodiments.

FIG. 4 sets forth a flow diagram of method steps for performing time synchronization with respect to a node within a network, according to various embodiments. Although the method steps are described in conjunction with the systems of FIGS. 1-2, persons skilled in the art will understand that any system configured to perform the method steps in any order falls within the scope of the present disclosure.

As shown, software application 242 receives 402, from a node in a network at a receive time, a discovery beacon that includes a network time associated with the node. For example, software application 242 could receive the discovery beacon during a discovery process that identifies neighboring nodes in a mesh network. The discovery beacon could include a time slot number of the node and/or other timing information that can be used to track the local network time on the node. After the discovery beacon is received, software application 242 could store the timing information in an entry for the node in a neighborhood table.

Next, software application 242 determines 404 a next receive time at which a periodic beacon from the node is to be received based on the network time and the receive time of the last beacon. For example, software application 242 could compute a current time slot number for the node based on a current time, the receive time of the discovery beacon, a previous time slot number representing the network time in the discovery beacon, and a time slot duration. Software application 242 could then compute the next receive time based on the time slot duration and a number of time slots between the current time slot number and an expected time slot number for the periodic beacon.

Software application 242 also calculates 406 a listening window for the periodic beacon based on the next receive time, a jitter uncertainty, a drift uncertainty, a missed synchronization component that is based on the number of missed periodic beacons from the node, and/or a maximum time uncertainty. For example, software application 242 could determine a first interval that begins at the next receive time and ends at an estimated time at which the SHR for the periodic beacon is expected to be received. Software application 242 could also calculate the jitter uncertainty, drift uncertainty, and missed synchronization component using Equations 7-14 and sum the jitter uncertainty, drift uncertainty, and missed synchronization component to obtain a second interval that precedes the next receive time and immediately follows the end time of the duration over which the SHR for the periodic beacon is expected to be received. Software application 242 could additionally ensure that the interval does not exceed a maximum time uncertainty for beacon listening windows.

Software application 242 then listens 408 for the periodic beacon during the listening window. For example, software application 242 could configure transceivers 206 to begin listening at the beginning of the listening window. If the SHR for the periodic beacon is received before the end of the listening window, software application 242 could configure transceivers 206 to continue listening past the end of the listening window to receive the entire periodic beacon.

Software application 242 performs processing based on a determination 410 as to whether the periodic beacon was received during the listening window. If the periodic beacon is received during the listening window, software application 242 stores 412 the network tine in the periodic beacon and a receive time for the periodic beacon in association with an identifier for the node in a neighborhood table. For example, software application 242 could store a mapping of the node's address to a time slot number in the periodic beacon and a timestamp representing the time at which the first bit of the preamble in the periodic beacon was received. If the periodic beacon is not received during the listening window, software application 242 does not update the entry for the node in the neighborhood table.

Software application 242 may continue listening 414 for periodic beacons from the node while the node is in the network and/or while software application 242 is able to maintain time synchronization with the node. While software application 242 continues listening for periodic beacons from the node, software application 242 may repeat operations 404-412 for each periodic beacon expected from the node. Software application 242 thus determines a listening window for a given periodic beacon from the node using timing information for the node in the neighborhood table. When a periodic beacon is received during a listening window, software application 242 updates the timing information for the node in the neighborhood table to maintain time synchronization with the node.

If a given periodic beacon from the node is missed, software application 242 increases the listening window for the next expected periodic beacon by the missed synchronization component. If periodic beacons from the node continue to be missed, software application 242 continues to increase the listening window until a maximum time uncertainty is reached. If a predefined timeout period since the receipt of the last periodic beacon from the node then lapses, software application 242 optionally increases the listening window to a "recovery time uncertainty" that is larger than the maximum time uncertainty to attempt to recover from an unexpected time misalignment with the neighboring node.

Software application 242 may attempt to receive a certain number of periodic beacons from the neighboring node using this increased recovery time uncertainty. If software application 242 receives a periodic beacon from the node within this number of attempts, software application 242 may revert to determining beacon listening windows for subsequent periodic beacons from the neighboring node using jitter uncertainties 304-306, drift uncertainties 308-310, and/or missed synchronization uncertainties 312-314. If software application 242 does not receive any periodic beacons from the node within this number of attempts, software application 242 may discontinue listening for periodic beacons from the node, remove an entry for the node from neighborhood table 208, log an event indicating a loss of timing synchronization with the node, and/or perform other actions to address the loss of timing synchronization with the node.

Listening Windows for Unicast Transmissions in a Mesh Network

Figure 5:
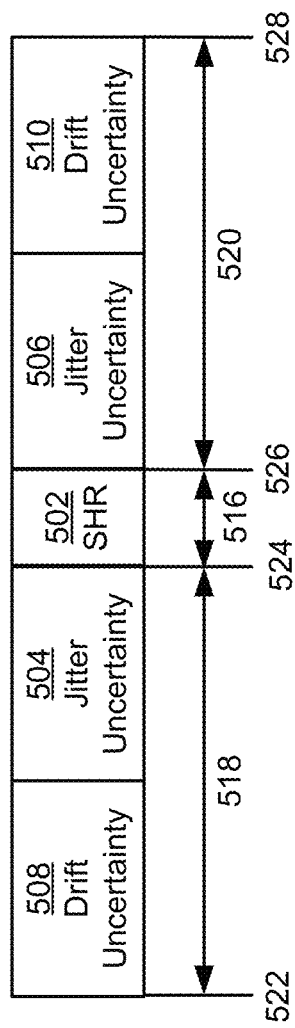
FIG. 5 illustrates the components of a unicast listening window over which the node of FIG. 2 listens for a unicast message from a neighboring node within a network, according to various embodiments.

FIG. 5 illustrates the components of a unicast listening window over which node 200 of FIG. 2 listens for a unicast message from a neighboring node within a network, according to various embodiments. As shown, the unicast listening window includes a first interval 516 that spans the duration over which a SHR 502, which includes a preamble and an SFD in the unicast message, is expected to be received.

Within the unicast listening window, interval 516 is denoted by a start time 524 and an end time 526. Start time 524 is set to the estimated receive time of the unicast message, which is calculated based on a unicast interval for node 200. For example, software application 242 could calculate a next time slot number representing start time 524 as a value that, when divided by a unicast interval representing a predefined number of time slots between consecutive listening times on node 200 for unicast transmissions from neighboring nodes, produces a modulus that equals a certain number. Software application 242 could then determine the time corresponding to the next time slot number based on the time slot duration and the number of time slots between the current time slot number and the calculated time slot number representing start time 524.

After start time 524 is estimated, software application 242 determines end time 526 of interval 516 based on start time 524 and an estimated duration over which SHR 502 is received. For example, software application 242 could estimate the duration over which SHR 502 is received based on the preamble and SFD bit definitions for a given physical layer (PHY) mode associated with transmission of the unicast message. Software application 242 could then add the duration to start time 524 to obtain end time 526.

As shown in FIG. 5, the unicast listening window also includes two intervals 518-520 of equal length that immediately precede and follow interval 516, respectively. Each of intervals 518-520 represents a time uncertainty associated with receiving the unicast message from the neighboring node at start time 524. Interval 518 includes a drift uncertainty 508 and a jitter uncertainty 504. Interval 520 includes a drift uncertainty 510 that has the same length as drift uncertainty 508 and a jitter uncertainty 506 that has the same length as jitter uncertainty 504.

Jitter uncertainties 504-506 account for timing jitter in both node 200 and the neighboring node. As a result, each jitter uncertainty may be calculated as a combination of the jitter uncertainty at node 200 and the jitter uncertainty at the neighboring node. For example, software application 242 could calculate the combined jitter uncertainty (as represented by JitterTimeUnc) using Equation 7:

$$\text{JitterTimeUnc} = \text{JitterMultiplier} * (2 * \text{JitterTime}) \quad (7)$$

As a result, jitter uncertainties 504-506 in the unicast listening window could be equal to jitter uncertainties 304-306 in the beacon listening window of FIG. 3.

Drift uncertainties 508-510 account for anticipated drift in timing between node 200 and the neighboring node. For example, software application 242 could set each drift uncertainty to a fixed value that is represented by UnicastDriftTimeUnc. This fixed value could be obtained as an attribute from a MAC PAN information base (PIB) associated with network system 100.

After jitter uncertainties 504-506 and drift uncertainties 508-510 are calculated for a given unicast transmission, software application 242 determines the length of each interval 518 and 520 (as represented by TimeUncertainty) by summing the respective uncertainties within the interval:

$$TimeUncertainty = JitterTimeUnc + UnicastDriftTimeUnc \quad (17)$$

After the duration of each of intervals 518-520 is calculated, software application 242 determines a listening start time 522 for the listening window by subtracting the duration from start time 524 and determines a listening end time 528 for the listening window by adding the duration to end time 526. Software application 242 then configures transceivers 206 to listen for a unicast transmission from the neighboring node beginning at listening start time 522 and ending at listening end time 528. If the preamble and SFD for the unicast transmission is received within the unicast listening window, software application 242 may continue listening beyond listening end time 528 to attempt to receive a frame for the unicast transmission.

In one or more embodiments, intervals 518-520 in the unicast listening window are selected to be longer than intervals 318-320 in the periodic beacon listening window of FIG. 3 to account for a neighboring node transmitting a unicast message to node 200 after missing one or more periodic beacons from node 200. For example, drift uncertainties 508-510 in intervals 518-520 could be set to a value that accounts for an estimated drift in timing between node 200 and the neighboring node after the neighboring node misses a certain number of consecutive periodic beacons from node 200. Drift uncertainties 508-510 could also, or instead, account for temperature fluctuations and/or other environmental factors that potentially increase the estimated drift in timing.

Those skilled in the art will appreciate that multiple neighboring nodes may "collide" in their transmissions of unicast messages to node 200 during the same unicast listening window. These colliding unicast messages can interfere with one another and prevent node 200 from receiving some or all of the unicast messages during the unicast listening window. A first neighboring node can detect a collision between a first unicast message from first the neighboring node to node 200 and a second unicast message from a second neighboring node to node 200 after failing to receive an acknowledgment of the first unicast message from node 200. To remedy the collision, the first neighboring node may randomly select, out of a certain number of future unicast listening windows for node 200 (e.g., the next 5-10 listening times on node 200 for unicast transmissions), a unicast listening window at which the first neighboring node retransmits the same unicast message. The first neighboring node may repeat the process of selecting a random future unicast listening window and retransmitting the first unicast message during the selected unicast listening window until the first neighboring node receives an acknowledgment of the first unicast message from node 200.

If the second neighboring node also fails to receive an acknowledgment of the second unicast message from node 200, the second neighboring node may similarly select a random future unicast listening window and retransmit the second unicast message during the selected unicast listening window. If the future unicast listening window selected by the second neighboring node differs from the future unicast listening window selected by the first neighboring node and no other unicast messages are transmitted during the selected future unicast listening windows, both neighboring nodes may successfully transmit their unicast messages to node at the respective selected unicast listening windows. If the future unicast listening window selected by the second neighboring node is the same as the future unicast listening window selected by the first neighboring node, unicast messages retransmitted by the neighboring nodes at the selected unicast listening window may collide again. Thus, both neighboring nodes may continue randomly selecting unicast listening windows at which the corresponding unicast messages are retransmitted to node 200 until both neighboring nodes receive acknowledgments of their unicast messages from node 200.

Figure 6A:
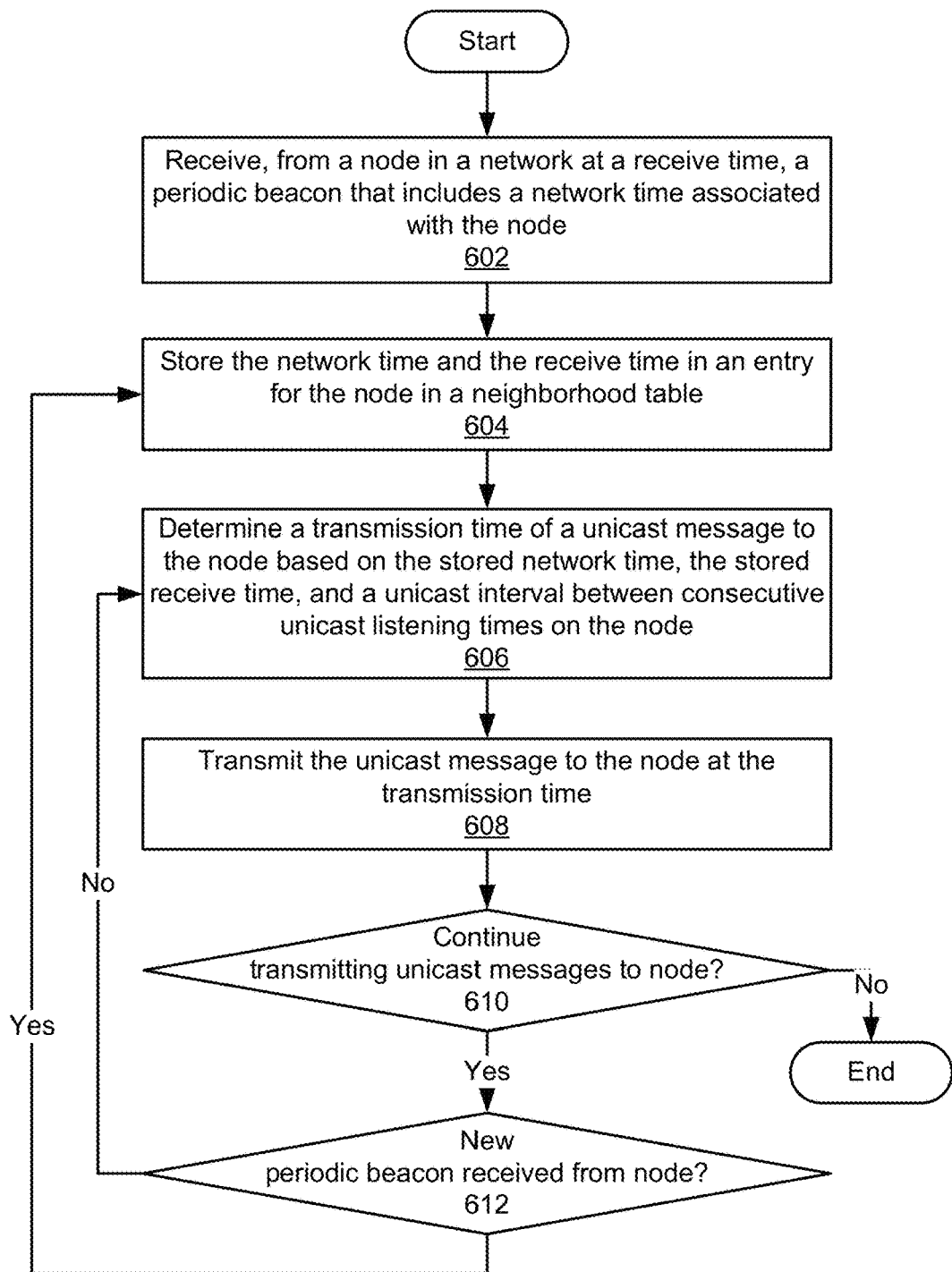
FIG. 6A sets forth a flow diagram of method steps for transmitting a unicast message to a node within a network, according to various embodiments.

FIG. 6A sets forth a flow diagram of method steps for transmitting a unicast message to a node within a network, according to various embodiments. Although the method steps are described in conjunction with the systems of FIGS. 1-2, persons skilled in the art will understand that any system configured to perform the method steps in any order falls within the scope of the present disclosure.

As shown, software application 242 receives 602, from the node at a receive time, a periodic beacon that includes a network time associated with the node. For example, software application 242 could receive the periodic beacon by performing some or all of the steps in the flow diagram of FIG. 4. The periodic beacon could include a time slot number of the node and/or other information that can be used to track the local network time on the node.

Next, software application 242 stores 604 the network time and the receive time in an entry for the node in a neighborhood table. For example, software application 242 could update the entry by replacing, in the entry, an older network time and an older receive time associated with a previously received periodic beacon from the node with the network time and the receive time of the periodic beacon received in operation 602.

Software application 242 determines 606 a transmission time of a unicast message to the node based on the stored network time, the stored receive time, and a unicast interval between consecutive unicast listening times on the node. For example, software application 242 could use Equations 1-3 to calculate the current time slot number on the node. Next, software application 242 could calculate the number of time slots to the next expected unicast listening time at the neighboring node (as represented by NumTSToNextUnicast) using the following equation:

$$NumTSToNextUnicast = UnicastInterval - modulo(nht\text{-}CurrentSlotNumber, UnicastInterval) \quad (18)$$

In Equation 18, UnicastInterval represents a predefined number of time slots between consecutive unicast listening times on the neighboring node.

Continuing with the above example, software application 242 could then calculate the time slot number corresponding to the transmission time of the unicast message (as represented by NextUnicastSlotNum) using the following equation:

$$NextUnicastSlotNum = modulo((nhtCurrentSlotNumber + NumTSToNextUnicast), TimeSlotRollover) \quad (19)$$

Finally, software application 242 could calculate the running time to the transmission time of the unicast message (as represented by RunningTimeNextUnicast) using the following equation:

$$RunningTimeNextUnicast = nhtTimeSlotStart + (modulo((NextUnicastSlotNum - nhtTimeSlotNumber + TimeSlotRollover), TimeSlotRollover)) * (TimeSlotDuration * (1 - nhtPPMAdjust)) \quad (20)$$

After the transmission time of the unicast message is determined, software application 242 transmits 608 the unicast message to the node at the transmission time. For example, software application 242 could transmit the unicast message at the beginning of the time slot number calculated in equation 19 or at a certain time offset into the time slot number.

Software application 242 may continue transmitting 610 unicast messages to the node. For example, software application 242 could continue to transmit unicast messages to the node while the node is in the network and/or while software application 242 is able to maintain time synchronization with the node.

If software application 242 continues transmitting unicast messages to the node, software application 242 may periodically receive 612 a new periodic beacon from the node. For example, software application 242 could receive a new periodic beacon from the node after a certain number of time slots have passed since the last periodic beacon. When a new periodic beacon is received from the node, software application 242 stores 604 the network time and the receive time for the new periodic beacon in an entry for the node in the neighborhood table (e.g., by replacing the old network time and receive time in the entry with the network time and the receive time for the new periodic beacon). Software application 242 then performs operation 606 to determine a next transmission time for another unicast message using the new network time and receive time. Software application 242 also performs operation 608 to selectively transmit a unicast message to the node at the transmission time (e.g., if software application 242 has a request, alert, data, and/or another communication to transmit to the node).

If a new periodic beacon has not been received from the node, software application 242 may use the stored network time and the stored receive time in the entry for the node in the neighborhood table to determine 606 the next transmission time for a unicast message to the node and transmit 608 a unicast message at the next transmission time.

Figure 6B:
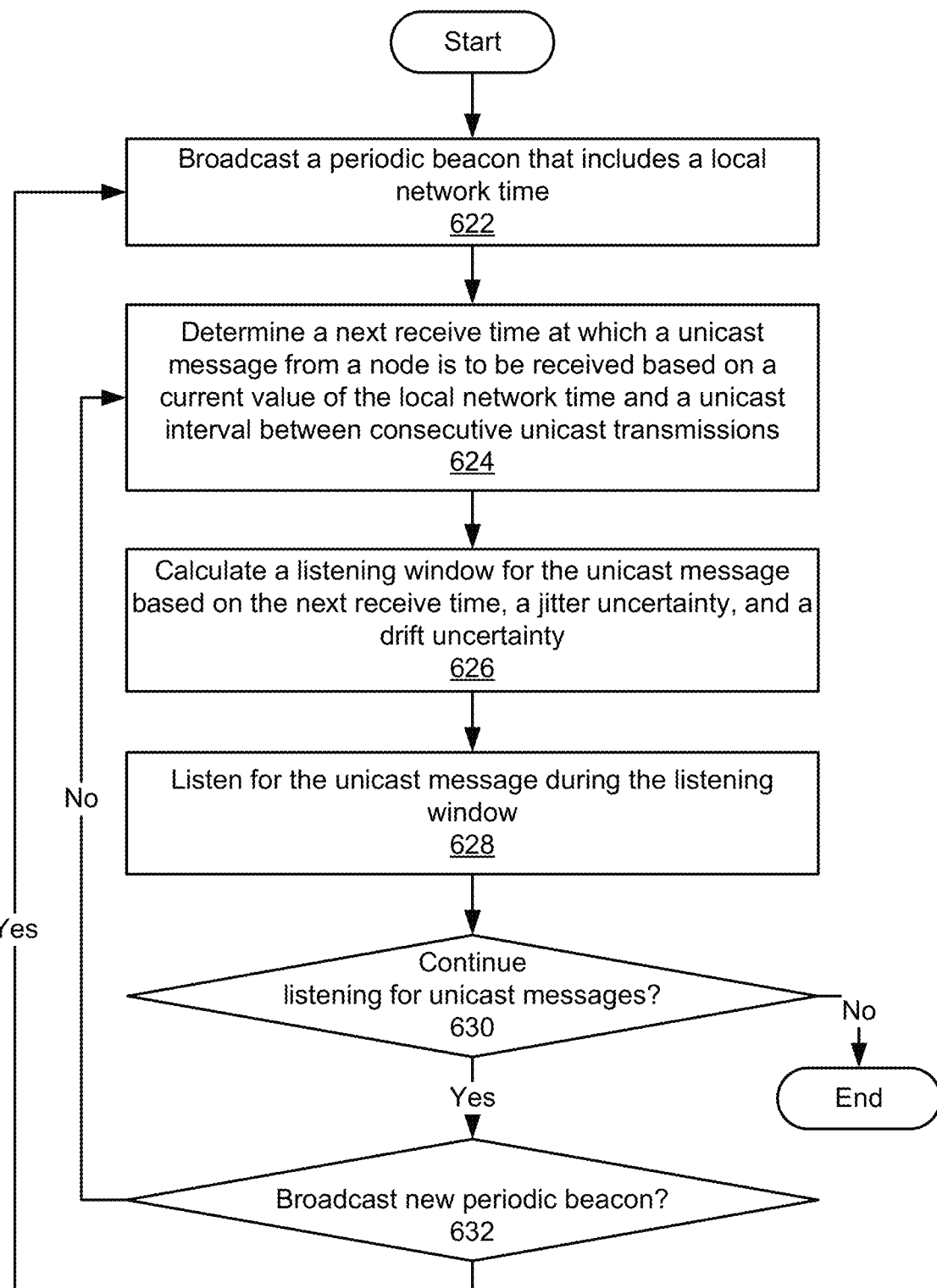
FIG. 6B sets forth a flow diagram of method steps for listening for a unicast transmission from a node within a network, according to various embodiments.

FIG. 6B sets forth a flow diagram of method steps for listening for a unicast transmission from a node within a network, according to various embodiments. Although the method steps are described in conjunction with the systems of FIGS. 1-2, persons skilled in the art will understand that any system configured to perform the method steps in any order falls within the scope of the present disclosure.

As shown, software application 242 broadcasts 622 a periodic beacon that includes a local network time. As mentioned above, software application could perform operation 622 on a periodic and/or regular basis. For example, software application 242 could determine that the periodic beacon is to be transmitted when a time slot number representing the local network time modulo the beaconing interval is equal to a certain value.

Software application 242 determines 624 a next receive time at which a unicast message from the node is to be received based on a current value of the local network time and a unicast interval between consecutive unicast listening times on the node. For example, software application 242 could calculate a next time slot number corresponding to the next receive time by adding, to a time slot number representing a previous receive time for unicast messages on node 200, a certain number of time slots representing the unicast interval. Software application 242 could also, or instead, calculate a series of receive times for unicast messages as time slot numbers that, when divided by the number of time slots in the unicast interval, produce a certain modulus.

Next, software application 242 calculates 626 a listening window for the unicast message based on the next receive time, a jitter uncertainty, and a drift uncertainty. For example, software application 242 could use Equation 7 to calculate the jitter uncertainty and obtain the drift uncertainty as a MAC layer attribute from a MAC PIB for the network. Software application 242 could determine the start time of the listening window by subtracting a sum of the jitter uncertainty and the drift uncertainty from the next receive time determined in operation 624. Software application 242 could also determine the end time of the listening window as a sum of the next receive time, a duration of a synchronization header for the unicast message, the jitter uncertainty, and the drift uncertainty.

Software application 242 then listens 628 for the unicast message during the listening window. For example, software application 242 could configure transceivers 206 to begin listening at the start time of the listening window. If the SHR for the unicast message is received before the end time of the listening window, software application 242 could configure transceivers 206 to continue listening past the end of the listening window to receive the entire unicast message.

Software application 242 may continue 630 listening for unicast messages. For example, software application 242 could listen for unicast messages from one or more neighboring nodes while the neighboring node(s) are in the network.

If software application 242 continues listening for unicast messages from one or more neighboring nodes, software application 242 may periodically broadcast 632 a new periodic beacon. For example, software application 242 could broadcast 622 a new periodic beacon after a certain number of time slots have passed since the last periodic beacon. Software application 242 may also use the local network time to determine 624 the next receive time for a unicast message from the node; calculate 626 a listening window for the unicast message based on the next receive time, the jitter uncertainty, and the drift uncertainty; and listen 628 for the unicast message during the listening window. Software application 242 may additionally aggregate payload data in unicast messages received using operations 624-628, forward the payload data in additional unicast messages to one or more other nodes in the network, and/or perform other tasks based on the payload data.

Handling Beaconing Conflicts in a Mesh Network

As mentioned above, beaconing conflicts 236 can occur in a network (e.g., network system 100 of FIG. 1) when timing drift between two neighboring nodes causes the transmission times of periodic beacons from the nodes to overlap. During a beaconing conflict between two nodes, each node may miss the periodic beacon from the other node because the node uses transceivers 206 to broadcast another periodic beacon instead of configuring transceivers 206 to listen for the periodic beacon from the other node. As described in further detail below, each node may handle the beaconing conflict by transmitting periodic beacons at alternate beaconing times. In turn, other nodes that have beaconing conflicts 236 with the node may receive the periodic beacons by listening for periodic beacons from the node during listening windows around the alternate beaconing times.

Figure 7:
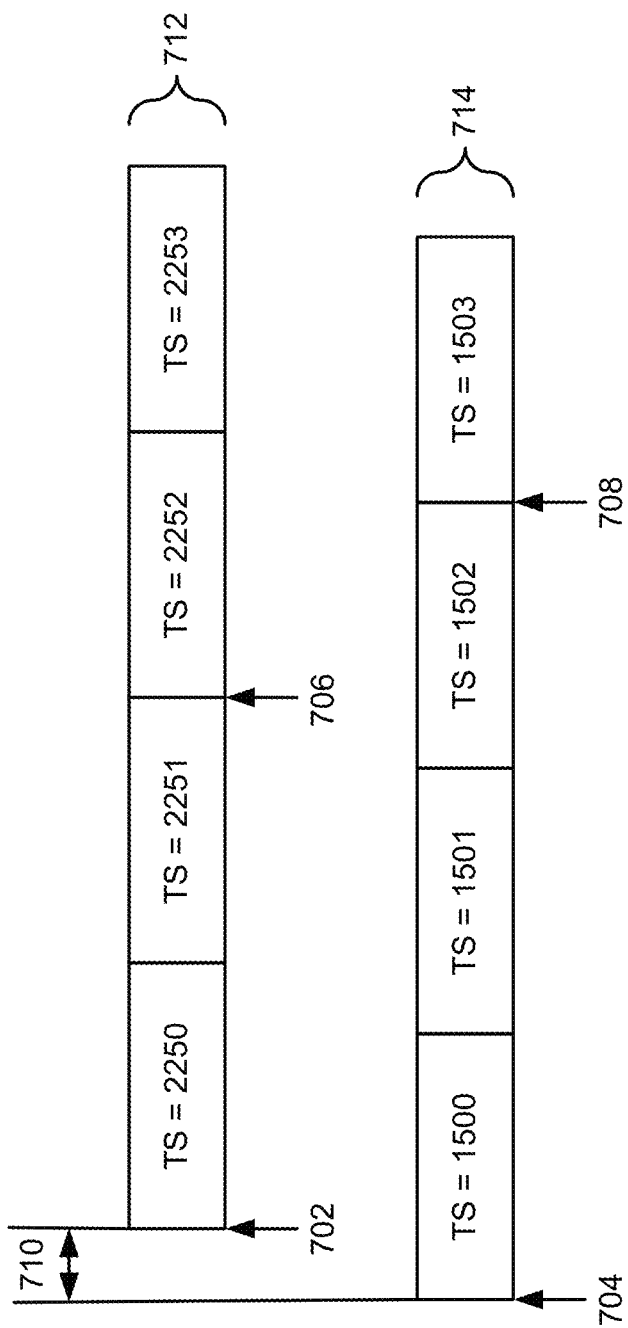
FIG. 7 illustrates how a beaconing conflict between a first node and a second node within a network is resolved, according to various embodiments.

FIG. 7 illustrates how a beaconing conflict between a first node and a second node within a network is resolved, according to various embodiments. As shown, the first node is represented by a series of time slots 712 that span the time slot numbers of 2250 to 2253, and the second node is represented by a series of time slots 714 that span the time slot numbers of 1500 to 1503. Because each node independently maintains a local network time, time slots 712-714 are not aligned or synchronized and can drift with respect to one another.

The first node performs a regularly scheduled periodic beacon transmission at a time 702 that corresponds to the beginning of time slot number 2250, and the second node performs a regularly scheduled periodic beacon transmission at a time 704 that corresponds to the beginning of time slot number 1500. Each periodic beacon from a node includes the time slot number at which the periodic beacon was transmitted and/or other timing information that allows the other node to track the local time on the node. A beaconing conflict between the nodes occurs when an interval 710 between times 702 and 704 decreases to the point where each node is required to transmit a periodic beacon and listen for a periodic beacon from the other node at the same time.

To address the beaconing conflict, the first node performs another periodic beacon transmission at an alternate time 706, and the second node performs another periodic beacon transmission at a different alternate time 708. In some embodiments, alternate times 706-708 represent the beginnings of time slots that are different from times 702-704 (and the corresponding time slots) at which regular scheduled periodic transmissions are made. More specifically, alternate time 706 corresponds to the beginning of time slot number 2252 at the first node, and alternate time 708 corresponds to the beginning of time slot number 1503 at the second node.

To avoid additional conflicts between the transmission and receipt of periodic beacons at alternate times 706-708, alternate times 706-708 are determined based on attributes that can be used to differentiate pairs of neighboring nodes in network system 100. For example, software application 242 on a given node could calculate a time slot representing an alternate time for another periodic beacon transmission by incrementing the hop count between the node and a root node in the network (e.g., network system 100 of FIG. 1) by 1 and adding the result to the time slot number of the regularly scheduled periodic beacon transmission on the node. Thus, a root node would transmit another periodic beacon at the beginning of a time slot that immediately follows the time slot of the regularly scheduled periodic beacon transmission on the root node. A node that is one hop away from the root node would transmit another periodic beacon at the beginning of a time slot that is two time slots after the time slot of the regularly scheduled periodic beacon transmission on the node. A node that is n hops away from the root node would transmit another periodic beacon at the beginning of a time slot that is n+1 time slots after the time slot of the regularly scheduled periodic beacon transmission on the node. Because alternate time 706 is two time slots away from the regularly scheduled periodic beacon transmission time 702 on the first node and alternate time 708 is three time slots away from the regularly scheduled periodic beacon transmission time 704 on the second node, the first node could be one hop away from the root node, and the second node could be two hops away from the root node.

During the beaconing conflict, each node also listens for the additional periodic beacon from the other node at the corresponding alternate time. For example, each node could calculate the time slot number of the additional periodic beacon from the other node based on the hop count of the other node to the root node. Each node could then use Equations 1-6 to determine the start time of the additional periodic beacon from the other node and could use Equations 7-16 to calculate a listening window for the additional periodic beacon. As described in further detail below with respect to FIGS. 8-11, each node additionally begins transmitting additional beacons at alternate times before listening for additional beacons from the other node to reduce disruptions to the other node's ability to perform synchronization with the node.

Resolving Conflicts Between Periodic Beacon Transmissions in a Mesh Network

Figure 8:
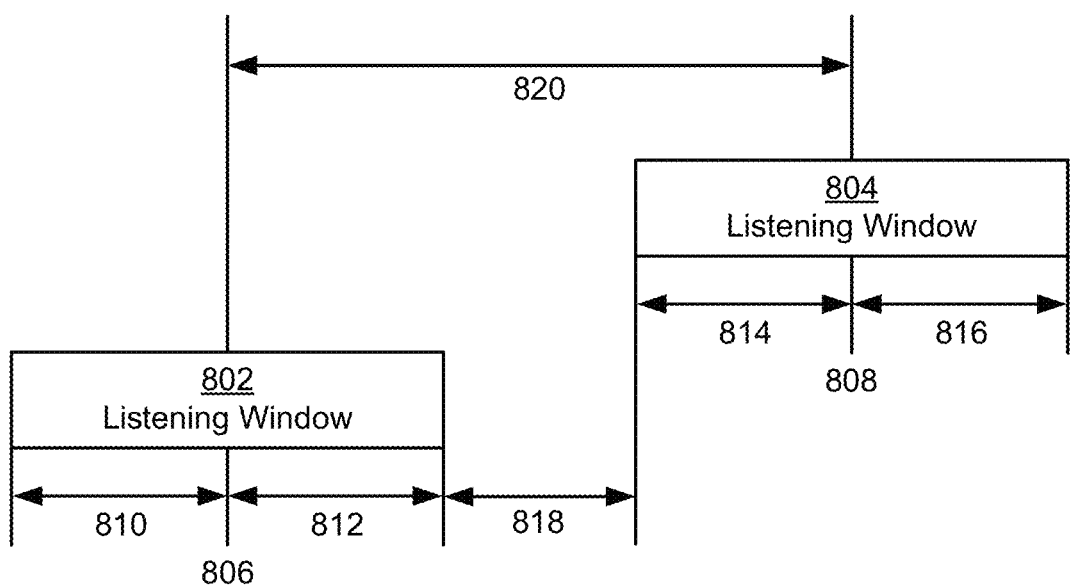
FIG. 8 illustrates how a scheduling conflict between the transmission of a first periodic beacon from a first node and the transmission of a second periodic beacon from a second node within a network is determined, according to various embodiments.

FIG. 8 illustrates how a scheduling conflict between the transmission of a first periodic beacon from a first node and the transmission of a second periodic beacon from a second node within a network is determined, according to various embodiments. This type of scheduling conflict represents an overlap in the beaconing schedules of the first and second nodes. As a result, this type of scheduling conflict can be identified by each node as the potential inability of the other node to use transceivers 206 to transmit one periodic beacon and receive another periodic beacon from the node.

As shown, the first periodic beacon is transmitted by the first node at a first time 806, and the second periodic beacon is transmitted by the second node at a second time 808. To receive the first periodic beacon, the second node calculates a listening window 802 for the first periodic beacon based on an estimate of time 806. Similarly, to receive the second periodic beacon, the first node calculates a listening window 804 for the second periodic beacon based on an estimate of time 808. Listening window 802 includes a first time uncertainty 810 that precedes time 806 and a second time uncertainty 812 that follows time 806, and listening window 804 includes a first time uncertainty 814 that precedes time 808 and a second time uncertainty 816 that follows time 808. As described above, each time uncertainty 810-816 may be calculated as a sum of a jitter uncertainty, a drift uncertainty, and/or a missed synchronization component. Each time uncertainty 810-816 may additionally be limited to a maximum time uncertainty associated with a listening window for a periodic beacon from a node.

After listening window 802 is determined, the second node listens for the first periodic beacon from the first node during listening window 802. Similarly, after listening window 804 is determined, the first node listens for the second periodic beacon from the second node during listening window 804.

Each node also calculates an interval 820 between transmission times 806-808 of the two periodic beacons from the two nodes. When interval 820 falls below a threshold, the node detects a scheduling conflict between the transmission of one periodic beacon from the node and the transmission of another periodic beacon from the other node.

In some embodiments, each node calculates interval 820 as the absolute value of the difference between the transmission time of the periodic beacon from the node and the transmission time of the periodic beacon from the other node. For example, the first node could calculate the transmission time 806 of the first periodic beacon as the beginning of the time slot at which the next periodic beacon from the first node is to be transmitted. The first node could also estimate the transmission time 808 of the second periodic beacon using Equations 1-6. Conversely, the second node could estimate the transmission time 806 of the first periodic beacon from the first node using Equations 1-6. The second node could also calculate the transmission time 808 of the second periodic beacon as the beginning of the time slot at which the next periodic beacon from the second node is to be transmitted. Each node could then calculate interval 820 as the absolute value of the difference between times 806 and 808.

Each node also determines the threshold with which interval 820 is compared as the sum of a first time uncertainty 812 in listening window 802, a second time uncertainty 814 in listening window 804, and an overhead factor 818 associated with switching between transmitting and receiving modes on transceivers 206. Because each node does not know the listening window calculated by the other node for a periodic beacon from the node, the node may set the time uncertainty in the listening window calculated by the other node to the maximum time uncertainty.

For example, the first node could set time uncertainty 814 to the sum of the jitter uncertainty, drift uncertainty, and/or missed synchronization component associated with receipt of the second periodic beacon from the second node at time 808. The first node could also set time uncertainty 812 to the maximum time uncertainty allowed in a listening window for a periodic beacon in the network (e.g., TimeUncertaintyMax). The first node could further set overhead factor 818 to a fixed value that accounts for switching between listening and receiving on transceiver 206, an interval over which the SHR for a given periodic beacon is received, additional types of overhead associated with time synchronization on one or both nodes, and/or a margin.

Conversely, the second node could set time uncertainty 812 to the sum of the jitter uncertainty, drift uncertainty, and/or missed synchronization component associated with receipt of the first periodic beacon from the first node at time 806. The second node could also set time uncertainty 814 to the maximum time uncertainty allowed in a listening window for a periodic beacon in the network. The second node could further set overhead factor 818 to the same fixed value as overhead factor 818 used by the first node.

When a node determines that interval 820 falls below the sum of time uncertainty 812, time uncertainty 814, and overhead factor 818, the node schedules an additional transmission of a periodic beacon at an alternate time. For example, the node determines a time slot number of the additional transmission based on the node's hop count to a root node (or another attribute associated with the node and/or the node's location in the network) and transmits the periodic beacon at the beginning of the time slot number. The node also transmits a periodic beacon at the regularly scheduled time (e.g., time 806 for the first node and time 808 for the second node). The transmission of the periodic beacon at the alternate time allows the other node to continue receiving updated timing information for the node during the scheduling conflict between periodic beacon transmissions from both nodes, while the transmission of the periodic beacon at the regularly scheduled time allows other neighboring nodes to receive the updated timing information for the node at regular intervals.

Figure 9:
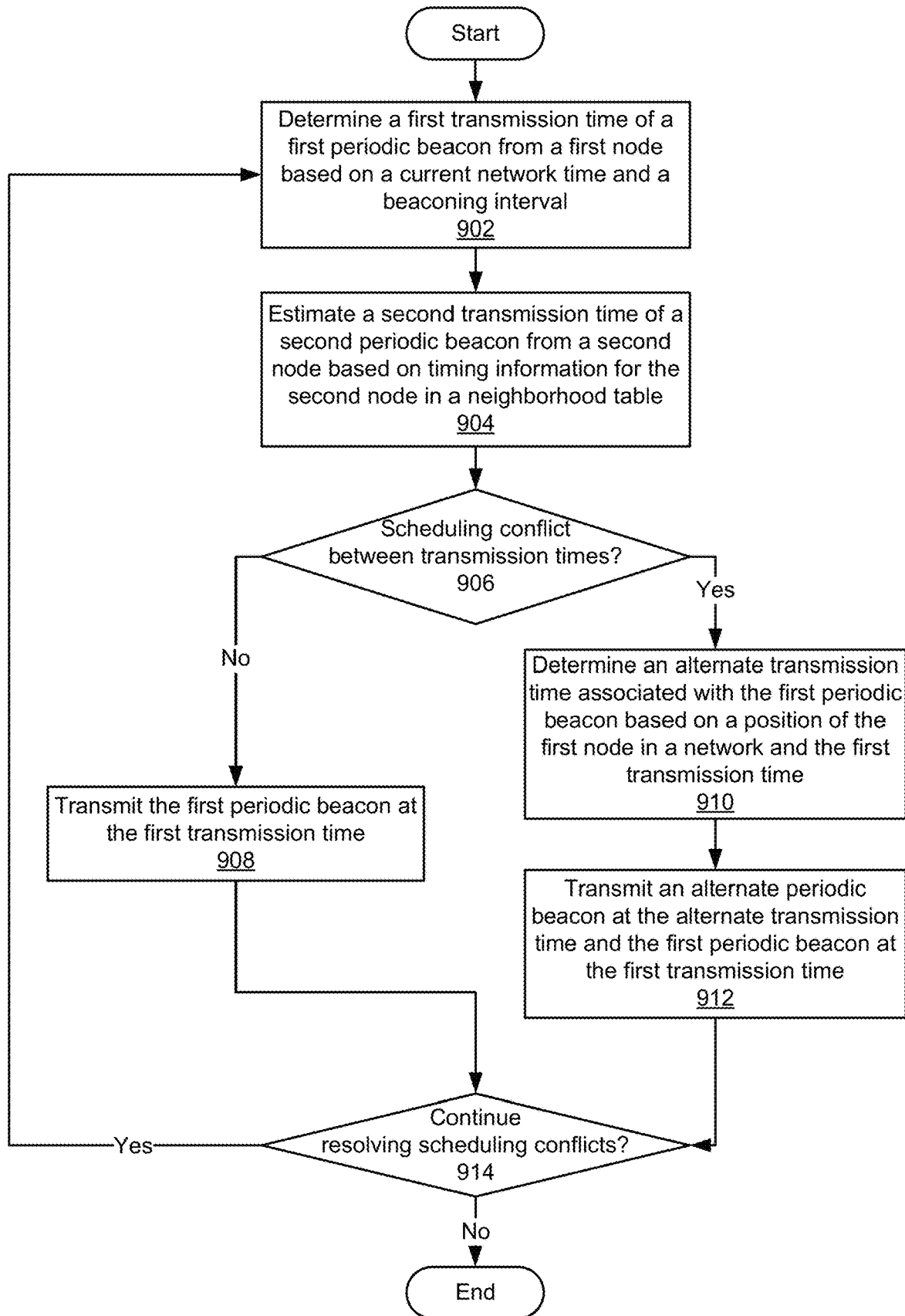
FIG. 9 sets forth a flow diagram of method steps for resolving a scheduling conflict between the transmission of a first periodic beacon from a first node and the transmission of a second periodic beacon from a second node within a network, according to various embodiments.

FIG. 9 sets forth a flow diagram of method steps for resolving a scheduling conflict between the transmission of a first periodic beacon from a first node and the transmission of a second periodic beacon from a second node within a network, according to various embodiments. Although the method steps are described in conjunction with the systems of FIGS. 1-2, persons skilled in the art will understand that any system configured to perform the method steps in any order falls within the scope of the present disclosure.

As shown, software application 242 on the first node determines 902 a first transmission time of a first periodic beacon from the first node based on a current network time and a beaconing interval. For example, software application 242 could determine that the first periodic beacon is to be transmitted when a time slot number representing the current network time modulo the beaconing interval is equal to a certain value.

Software application 242 also estimates 904 a second transmission time of a second periodic beacon from the second node based on timing information for the second node in a neighborhood table. For example, software application 242 could store timing information associated with a most recently received periodic beacon from the second node in an entry for the second node in the neighborhood table. Software application 242 could use the timing information from the entry and Equations 1-6 to calculate the second transmission time of the second periodic beacon from the second node.

Next, software application 242 determines 906 whether or not a scheduling conflict exists between the two transmission times. For example, software application 242 could calculate an interval between the transmission times and compare the interval to a threshold that is based on a first time uncertainty included in a first listening window associated with receiving the first periodic beacon from the first node, a second time uncertainty included in a second listening window associated with receiving the second periodic beacon from the second node, and an overhead factor. The first time uncertainty could be set to the maximum time uncertainty associated with a periodic beacon listening window, and the second time uncertainty could include a jitter uncertainty, a drift uncertainty, and/or a missed synchronization component. When the interval exceeds the threshold, software application 242 could determine that the scheduling conflict does not exist. When the interval does not exceed the threshold, software application 242 could determine that the scheduling conflict exists. If software application 242 determines in operation 906 that no scheduling conflict exists, software application 242 transmits 908 the first periodic beacon at the first transmission time determined in operation 902.

If software application 242 determines in operation 906 that a scheduling conflict exists, software application 242 determines 910 an alternate transmission time associated with the first periodic beacon based on a position of the first node in a network and the first transmission time. For example, software application 242 could calculate a time slot number representing the alternate transmission time based on the node's hop count to a root node in the network and another time slot number representing the first transmission time. Software application 242 then transmits 912 an alternate periodic beacon at the alternate transmission time determined in operation 908 and the first periodic beacon at the first transmission time. The alternate periodic beacon could include the timing information (e.g., a time slot number) from the first periodic beacon, or the alternate periodic beacon could include updated timing information that reflects the alternate transmission time of the alternate periodic beacon.

Software application 242 may repeat operations 902-912 to continue 914 resolving scheduling conflicts between transmission times of periodic beacons from the first and second nodes. For example, software application 242 could continue to detect and resolve the scheduling conflicts while periodic beacons are transmitted by the first and second nodes and/or while the first node maintains time synchronization with the second node via the periodic beacons.

Figure 10:
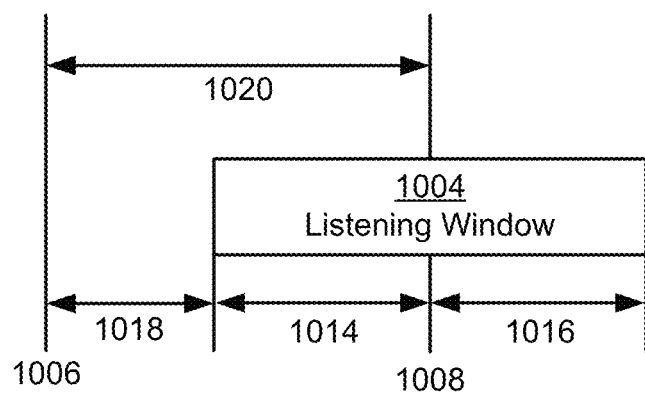
FIG. 10 illustrates how a scheduling conflict between the transmission of a first periodic beacon from a first node and the listening window for a second periodic beacon being received from a second node within a network is determined, according to various embodiments.

Resolving Conflicts Between Periodic Beacons Transmitted to a Node and Periodic Beacons Received from the Node FIG. 10 illustrates how a scheduling conflict between the transmission of a first periodic beacon from a first node and a listening window 1004 for a second periodic beacon being received from a second node within a network is determined, according to various embodiments. This type of scheduling conflict prevents the first node from using transceivers 206 to both transmit the first periodic beacon and listen for the second periodic beacon from the second node.

As shown in FIG. 10, the first periodic beacon is transmitted at a first time 1006, and the second periodic beacon is transmitted at a second time 1008. The first node estimates time 1008 based on timing information for the second node in the neighborhood table. The first node then determines a listening window 1004 for the second periodic beacon based on time 1008, a first time uncertainty 1014 that precedes time 1008, and a second time uncertainty 1016 that follows time 1008. As described above, each time uncertainty 1014-1016 may be calculated as a sum of a jitter uncertainty, a drift uncertainty, and/or a missed synchronization component. Each time uncertainty 1014-1016 may additionally be limited to a maximum time uncertainty associated with a listening window for a periodic beacon from a node.

As with the scheduling conflict depicted in FIG. 8, the scheduling conflict illustrated in FIG. 10 is determined based on an interval 1020 between time 1006 and time 1008. When interval 1020 falls below a threshold, the first node detects a scheduling conflict between the transmission of the first periodic beacon from the first node and listening window 1004 for the second periodic beacon from the second node.

For example, the first node could calculate the transmission time 1006 of the first periodic beacon as the beginning of the time slot at which the next regularly scheduled periodic beacon is to be transmitted from the first node. The first node could also estimate the transmission time 1008 of the second periodic beacon using Equations 1-6. The first node could then calculate interval 1020 as the absolute value of the difference between times 1006 and 1008.

The first node also determines the threshold with which interval 1020 is compared as the sum of time uncertainty 1014 in listening window 1004 and an overhead factor 1018 associated with switching between transmitting and receiving modes on transceivers 206. Overhead factor 1018 may be determined in a similar or identical manner to overhead factor 818 in FIG. 8. When the first node determines that interval 1020 falls below the sum of time uncertainty 1014 and overhead factor 1018, the first node begins listening for an additional periodic beacon from the second node at the corresponding alternate transmission time. For example, the first node could use the hop count of the second node to the root node of the network to estimate the alternate transmission time and calculate a listening window around the alternate transmission time. The first node could then listen for the additional periodic beacon from the second node during the listening window.

Because interval 1020 is shorter than interval 820 of FIG. 8, the first node begins transmitting the first periodic beacon at a first alternate transmission time before the first node begins listening for the second periodic beacon at a second alternate transmission time. As a result, the first node prioritizes additional transmission of the first periodic beacon at the first alternate transmission time to the second node over receipt of the second periodic beacon from the second node at the second alternate transmission time.

While FIG. 10 is depicted from the perspective of the first node, those skilled in the art will appreciate that the second node may detect the scheduling conflict between transmission of the first and second periodic beacons in a similar manner. For example, the second node could determine the transmission time 1008 of the second periodic beacon as the beginning of the time slot at which the next regularly scheduled periodic beacon is to be transmitted from the second node. The second node could also estimate the transmission time 1006 of the first periodic beacon using Equations 1-6. The second node could then calculate interval 1020 as the absolute value of the difference between times 1006 and 1008. The second node could further determine the threshold with which interval 1020 is compared as the sum of a time uncertainty in a listening window for the first periodic beacon and overhead factor 108. When interval 1020 falls below the threshold, the second node could determine a listening window for an additional periodic beacon from the first node at an alternate transmission time that is based on the hop count of the first node to a root node of the network. The second node could then listen for the additional periodic beacon from the first node during the listening window.

Those skilled in the art will also appreciate that scheduling conflicts can also exist between listening windows for periodic beacons from multiple neighboring nodes. For example, a given node could have listening windows for periodic beacons from multiple neighboring nodes. Timing differences among two or more neighboring nodes could additionally cause the listening windows to coincide and/or drift closer to one another. When the interval between the transmission times of periodic beacons from two neighboring nodes falls below a threshold that is calculated as the sum of a first time uncertainty in a first listening window for a first periodic beacon from a first neighboring node, a second time uncertainty in a second listening window for a second periodic beacon from a second neighboring node, and an overhead factor (e.g., overhead factor 818 and/or 1018), the node could detect a scheduling conflict in the listening windows for the periodic beacons from the neighboring nodes. This type of scheduling conflict may prevent the node from receiving periodic beacons from both neighboring nodes (e.g., because the node is unable to configure transceivers 206 to finish listening for one periodic beacon and begin listening for another periodic beacon).

To address a scheduling conflict between listening windows for periodic beacons from two or more neighboring nodes, a given node could listen for a periodic beacon from the neighboring node with the oldest synchronization time in the neighborhood table. After a new periodic beacon is received from the neighboring node, the entry for the neighboring node is updated with a new synchronization time representing the time at which the new periodic beacon was received. If the scheduling conflict is detected in subsequent periodic beacons from the neighboring nodes, the node could then listen for a periodic beacon from a different neighboring node with the oldest synchronization time in the neighborhood table.

Figure 11:
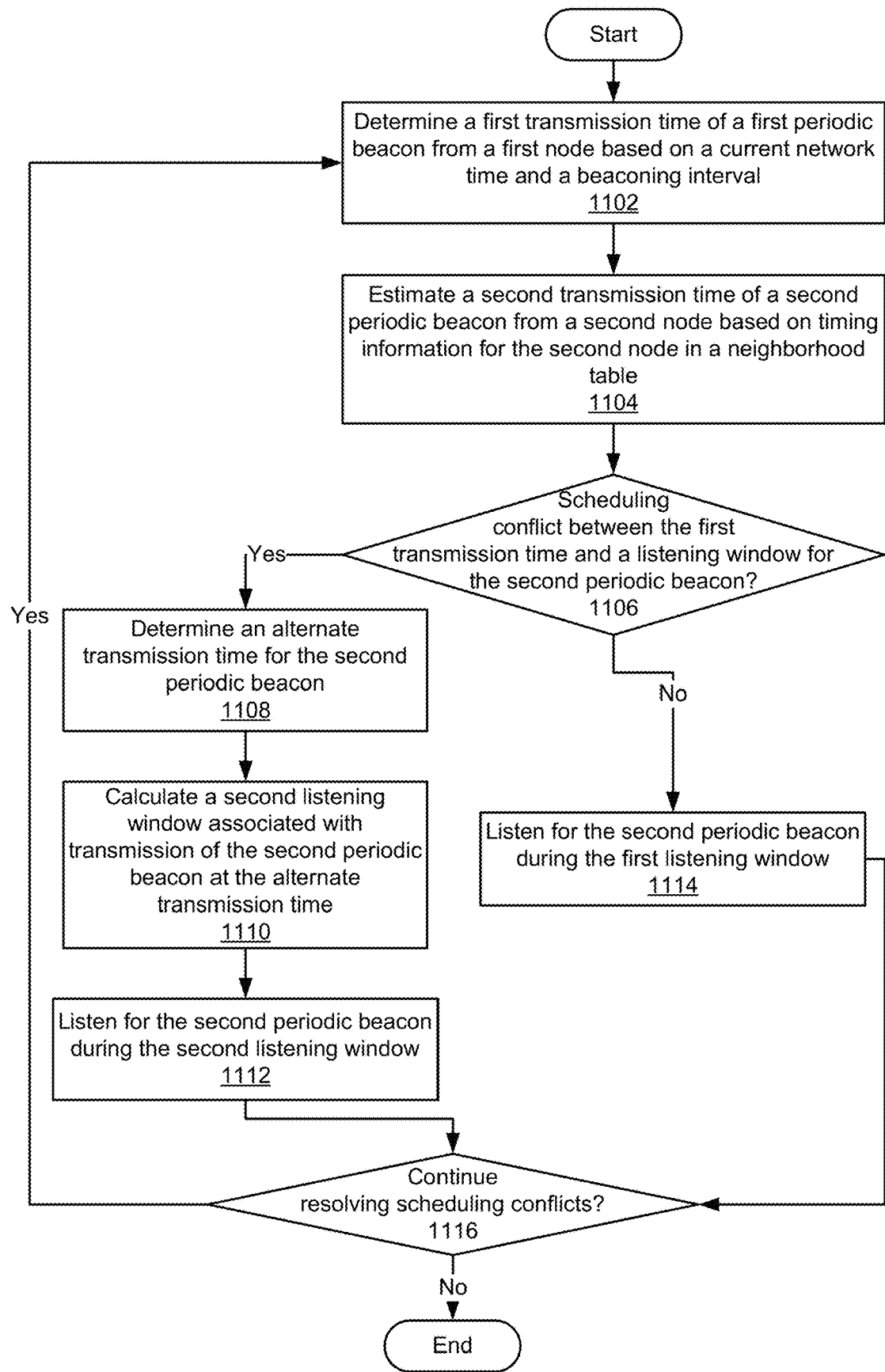
FIG. 11 sets forth a flow diagram of method steps for resolving a scheduling conflict between the transmission of a first periodic beacon from a first node and the listening window for a second periodic beacon being received from a second node within a network, according to various embodiments.

FIG. 11 sets forth a flow diagram of method steps for resolving a scheduling conflict between the transmission of a first periodic beacon from a first node and the listening window for a second periodic beacon being received from a second node within a network, according to various embodiments. Although the method steps are described in conjunction with the systems of FIGS. 1-2, persons skilled in the art will understand that any system configured to perform the method steps in any order falls within the scope of the present disclosure.

As shown, software application 242 on the first node determines 1102 a first transmission time of a first periodic beacon from the first node based on a current network time and a beaconing interval. For example, software application 242 could determine that the first periodic beacon is to be transmitted when a time slot number representing the current network time modulo the beaconing interval is equal to a certain value.

Software application 242 also estimates 1104 a second transmission time of a second periodic beacon from the second node based on timing information for the second node in a neighborhood table. For example, software application 242 could store timing information (e.g., a time slot number included in a previous periodic beacon from the second node, a receive time for the previous beacon, etc.) associated with a most recently received periodic beacon from the second node in an entry for the second node in the neighborhood table. Software application 242 could use the timing information from the entry and Equations 1-6 to calculate the second transmission time of the second periodic beacon from the second node.

Next, software application 242 determines 1106 whether or not a scheduling conflict exists between the first transmission time and a first listening window for the second periodic beacon. For example, software application 242 could calculate an interval between the transmission times and compare the interval to a threshold that is based on a time uncertainty included in the first listening window and an overhead factor. When the interval exceeds the threshold, software application 242 could determine that the scheduling conflict does not exist. When the interval does not exceed the threshold, software application 242 could determine that the scheduling conflict exists. If software application 242 determines in operation 1106 that no scheduling conflict exists, software application 242 listens 1112 for the second periodic beacon during the first listening window.

If software application 242 determines in operation 1106 that a scheduling conflict exists, software application 242 determines 1108 an alternate transmission time for the second periodic beacon based on the second transmission time and a position of the second node in the network. For example, software application 242 could calculate a time slot offset based on a hop count from the second node to a root node in the network and add the time slot offset to a time slot number corresponding to the second transmission time to produce another time slot number representing the alternate transmission time.

Next, software application 242 calculates 1110 a second listening window associated with transmission of the second periodic beacon at the alternate transmission time. For example, software application 242 could determine a time uncertainty associated with receiving the second periodic beacon at the alternate transmission time based on a jitter uncertainty, a drift uncertainty, and/or a missed synchronization component. Software application 242 could calculate a start time for the second listening window by subtracting the time uncertainty from the alternate transmission time. Software application 242 could also calculate an end time for the listening window as a sum of the alternate transmission time, an interval over which a synchronization header for the periodic beacon is to be received, and the time uncertainty.

Software application 242 then listens 1112 for the second periodic beacon during the second listening window. For example, software application 242 could receive a preamble and a start frame delimiter for the second periodic beacon during the second listening window. Software application 242 could then listen for a frame included in the second periodic beacon after the second listening window has lapsed.

Software application 242 may repeat operations 1102-1114 to continue 1116 resolving scheduling conflicts between a transmission time of a periodic beacon from the first node and a listening window for a periodic beacon from the second node. For example, software application 242 could continue to detect and resolve the scheduling conflicts while periodic beacons are transmitted by the first and second nodes and/or the first node maintains time synchronization with the second node via the periodic beacons.

In sum, the disclosed techniques use periodic beacons to perform time synchronization across nodes in a network (e.g., a mesh network). Each node in the network maintains a separate local network time and does not change the local network time to track the timing of another node in the network. Each node also broadcasts periodic beacons at regular intervals to neighboring nodes in the network. The periodic beacons provide timing information (e.g., the local network time at the node and a time at which the node was received) that allows the neighboring nodes to track the local network time at the node. After a neighboring node receives a periodic beacon from the node, the neighboring node updates an entry for the node in a neighborhood table with the timing information. The neighboring node also uses the updated timing information to determine a listening window for the next periodic beacon and listens for the next periodic beacon during the listening window. Thus, the nodes transmit and receive periodic beacons to communicate and track local network times with one another.

The nodes also use the timing information to determine listening windows for unicast messages and listen for the unicast messages during the listening windows. To avoid conflicts with sending and receiving periodic beacons, these unicast messages are transmitted at regular intervals that are different from the intervals with which the periodic beacons are transmitted. The unicast messages can be used to exchange, propagate, or aggregate metrology data, events, errors, requests, and/or other information among the nodes.

When timing drift or timing differences between two nodes result in a scheduling conflict in the transmission and/or receipt of periodic beacons by the nodes, each node broadcasts an additional periodic beacon at an alternate transmission time, and the other node listens for the additional periodic beacon during a listening window around the alternate transmission time. To prevent further scheduling conflicts in transmitting and receiving the additional periodic beacons, the additional transmission time of a periodic beacon from a given node is determined based on the node's hop count to a root node in the network (or another attribute that differentiates the node from the node's neighbors in the network).

Each node determines a scheduling conflict between a first transmission time of a first periodic beacon from the node and a second transmission time of a second periodic beacon from a neighboring node by comparing an interval between the two transmission times to a threshold. The threshold includes a first time uncertainty associated with receiving the second periodic beacon from the neighboring node, a maximum time uncertainty associated with the neighboring node receiving the first periodic beacon, and an overhead factor. When the interval falls below the threshold, the node transmits the first periodic beacon at both the first transmission time and an alternate transmission time.

Each node additionally determines a scheduling conflict between a first transmission time of a first periodic beacon from the node and a listening window for a second periodic beacon from a neighboring node by comparing the interval between the transmission times of the two periodic beacons to a lower threshold. This lower threshold includes a time uncertainty associated with receiving the second periodic beacon from the neighboring node and the overhead factor. When the interval falls below the threshold, the node determines a listening window for the second periodic beacon around the alternate transmission time for the second periodic beacon and listens for the second periodic beacon during the listening window.

One technical advantage of the disclosed techniques relative to the prior art is that, with the disclosed techniques, a given node within a network can maintain time synchronization with the other nodes within the network without having to match the local timing of any of the other nodes. Accordingly, with the disclosed techniques, a node in a network can avoid the accumulation and magnification of timing errors and time synchronization delays that result from the node changing an internal clock to match the local timing of a root node in the network via timing messages transmitted along a path from the root node to the node. Another technical advantage is that the disclosed techniques enable a given node within a network to perform time synchronization operations with neighboring nodes in the network using a relatively shorter listening window. Accordingly, the disclosed techniques reduce power consumption and resource overhead for a node relative to conventional approaches that require a node to implement an extended listening window to receive timing messages from the other nodes within a network. These technical advantages provide one or more technological improvements over prior art approaches.

1. In some embodiments, a computer-implemented method for performing time synchronization within a network comprises detecting a first scheduling conflict between a first transmission time associated with a first periodic beacon from a first node in the network and a first listening window associated with receiving a second periodic beacon from a second node in the network, determining a first alternate transmission time for the second periodic beacon based on a second transmission time associated with the second periodic beacon and a position of the second node in the network, calculating a second listening window associated with transmission of the second periodic beacon from the second node at the first alternate transmission time, and listening for the second periodic beacon during the second listening window.

2. The computer-implemented method of clause 1, further comprising detecting a second scheduling conflict between a third transmission time associated with a third periodic beacon from the first node and a fourth transmission time associated with a fourth periodic beacon from the second node, determining a second alternate transmission time for the third periodic beacon based on the third transmission time, transmitting the third periodic beacon at the third transmission time, and transmitting an alternate beacon at the second alternate transmission time.

3. The computer-implemented method of clauses 1 or 2, wherein detecting the second scheduling conflict comprises determining that an interval between the third transmission time and the fourth transmission time does not exceed a threshold amount of time that is based on a first time uncertainty for a third listening window associated with receiving the third periodic beacon from the first node and a second time uncertainty included in a fourth listening window associated with receiving the fourth periodic beacon from the second node.

4. The computer-implemented method of any of clauses 1-3, wherein determining the second alternate transmission time comprises calculating a time slot offset based on a hop count between the first node and a root node in the network, and adding the time slot offset to a time slot number corresponding to the third transmission time.

5. The computer-implemented method of any of clauses 1-4, wherein detecting the first scheduling conflict comprises determining that an interval between the first transmission time and the second transmission time does not exceed a threshold amount of time that is based on a time uncertainty included in the first listening window and an overhead factor.

6. The computer-implemented method of any of clauses 1-5, wherein the time uncertainty comprises a jitter uncertainty and a drift uncertainty.

7. The computer-implemented method of any of clauses 1-6, wherein determining the first alternate transmission time for the second periodic beacon comprises calculating a time slot number corresponding to the first alternate transmission time based on a hop count between the second node and a root node in the network, wherein the hop count represents the position of the second node in the network.

8. The computer-implemented method of any of clauses 1-7, wherein determining the second listening window comprises determining a time uncertainty associated with receiving the second periodic beacon based on a jitter uncertainty, a drift uncertainty, and a missed synchronization component that is determined based on a number of missed periodic beacons from the second node.

9. The computer-implemented method of any of clauses 1-8, wherein determining the second listening window further comprises calculating a start time for the second listening window by subtracting the time uncertainty from the first alternate transmission time, and calculating an end time for the second listening window by adding the first alternate transmission time, an interval over which a synchronization header for the second periodic beacon is to be received, and the time uncertainty.

10. The computer-implemented method of any of clauses 1-9, wherein the network comprises a mesh network.

11. In some embodiments, one or more non-transitory computer readable media store instructions that, when executed by one or more processors, cause the one or more processors to perform the steps of detecting a first scheduling conflict between a first transmission time associated with a first periodic beacon from a first node in a network and a first listening window associated with receiving a second periodic beacon from a second node in the network, determining a first alternate transmission time for the second periodic beacon based on a second transmission time associated with the second periodic beacon and a position of the second node in the network, calculating a second listening window associated with transmission of the second periodic beacon from the second node at the first alternate transmission time, and listening for the second periodic beacon during the second listening window.

12. The one or more non-transitory computer readable media of clause 11, wherein the instructions further cause the one or more processors to perform the steps of detecting a second scheduling conflict between a third transmission time associated with a third periodic beacon from the first node and a fourth transmission time associated with a fourth periodic beacon from the second node, determining a second alternate transmission time for the third periodic beacon based on the third transmission time, transmitting the third periodic beacon at the third transmission time, and transmitting an alternate beacon at the second alternate transmission time.

13. The one or more non-transitory computer readable media of clauses 11 or 12, wherein detecting the second scheduling conflict comprises determining that an interval between the third transmission time and the fourth transmission time does not exceed a sum of a first time uncertainty included in a third listening window associated with receiving the third periodic beacon from the first node and a second time uncertainty included in a fourth listening window associated with receiving the fourth periodic beacon from the second node.

14. The one or more non-transitory computer readable media of any of clauses 11-13, wherein detecting the first scheduling conflict comprises determining that an interval between the first transmission time and the second transmission time does not exceed a sum of a time uncertainty included in the first listening window and an overhead factor.

15. The one or more non-transitory computer readable media of any of clauses 11-14, wherein determining the first alternate transmission time comprises calculating a time slot offset based on a hop count from the second node to a root node in the network, wherein the hop count represents the position of the second node in the network, and adding the time slot offset to a time slot number corresponding to the second transmission time.

16. The one or more non-transitory computer readable media of any of clauses 11-15, wherein the instructions further cause the one or more processors to perform the steps of detecting a second scheduling conflict between a third listening window associated with receiving a third periodic beacon from a third node and a fourth listening window associated with receiving a fourth periodic beacon from a fourth node, selecting, from the third node and the fourth node, a node with an older periodic beacon receive time, and listening for a periodic beacon from the node during a corresponding listening window.

17. The one or more non-transitory computer readable media of any of clauses 11-16, wherein detecting the second scheduling conflict comprises determining that an interval between a third transmission time associated with the third periodic beacon and a fourth transmission time associated with the fourth periodic beacon does not exceed a threshold amount of time that is based on a first time uncertainty included in the third listening window, a second time uncertainty included in the fourth listening window, and an overhead factor.

18. The one or more non-transitory computer readable media of any of clauses 11-17, further comprising estimating the second transmission time based on a network time included in a previous periodic beacon from the second node and a receive time of the previous periodic beacon.

19. The one or more non-transitory computer readable media of any of clauses 11-18, wherein listening for the second periodic beacon comprises receiving a preamble and a start frame delimiter for the second periodic beacon during the second listening window, and listening for a frame included in the second periodic beacon after the second listening window has lapsed.

20. In some embodiments, a system comprises a memory that stores instructions, and a processor that is coupled to the memory and, when executing the instructions, is configured to detect a first scheduling conflict between a first transmission time associated with a first periodic beacon from a first node in a network and a first listening window associated with receiving a second periodic beacon from a second node in the network, determine a first alternate transmission time for the second periodic beacon based on a second transmission time associated with the second periodic beacon and a position of the second node in the network, calculate a second listening window associated with transmission of the second periodic beacon from the second node at the first alternate transmission time, and listen for the second periodic beacon during the second listening window.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
    detecting, by a first node in a network, a first scheduling conflict between a first transmission time associated with a first periodic beacon from the first node and a first listening window associated with receiving a second periodic beacon from a second node in the network;
    determining, by the first node, a first alternate transmission time for the second node to transmit the second periodic beacon based on a second transmission time of the second periodic beacon by the second node and a position of the second node in the network;
    calculating, by the first node, a second listening window to receive the second periodic beacon from the second node at the first alternate transmission time; and
    listening, by the first node, for the second periodic beacon during the second listening window.

2. The method of claim 1, further comprising:
    detecting a second scheduling conflict between a third transmission time of a third periodic beacon by the first node and a fourth transmission time of a fourth periodic beacon by the second node;
    determining a second alternate transmission time for the first node to transmit the third periodic beacon based on the third transmission time;
    transmitting, by the first node, the third periodic beacon at the third transmission time; and
    transmitting, by the first node, an alternate beacon at the second alternate transmission time.

3. The method of claim 2, wherein detecting the second scheduling conflict comprises determining that an interval between the third transmission time and the fourth transmission time does not exceed a threshold amount of time that is based on a first time uncertainty for a third listening window associated with receiving the third periodic beacon from the first node and a second time uncertainty included in a fourth listening window associated with receiving the fourth periodic beacon from the second node.

4. The method of claim 2, wherein determining the second alternate transmission time comprises:
    calculating a time slot offset based on a hop count between the first node and a root node in the network; and
    adding the time slot offset to a time slot number corresponding to the third transmission time.

5. The method of claim 1, wherein detecting the first scheduling conflict comprises determining that an interval between the first transmission time and the second transmission time does not exceed a threshold amount of time that is based on a time uncertainty included in the first listening window and an overhead factor.

6. The method of claim 5, wherein the time uncertainty comprises a jitter uncertainty and a drift uncertainty.

7. The method of claim 1, wherein determining the first alternate transmission time for the second periodic beacon comprises calculating a time slot number corresponding to the first alternate transmission time based on a hop count between the second node and a root node in the network, wherein the hop count represents the position of the second node in the network.

8. The method of claim 1, wherein determining the second listening window comprises determining a time uncertainty associated with receiving the second periodic beacon based on a jitter uncertainty, a drift uncertainty, and a missed synchronization component that is determined based on a number of missed periodic beacons from the second node.

9. The method of claim 8, wherein determining the second listening window further comprises:
    calculating a start time for the second listening window by subtracting the time uncertainty from the first alternate transmission time; and
    calculating an end time for the second listening window by adding the first alternate transmission time, an interval over which a synchronization header for the second periodic beacon is to be received, and the time uncertainty.

10. The method of claim 1, wherein the network comprises a mesh network.

11. One or more non-transitory computer readable media storing instructions that, when executed by one or more processors, cause the one or more processors of a first node in a network to perform the steps of:
    detecting a first scheduling conflict between a first transmission time associated with a first periodic beacon from the first node and a first listening window associated with receiving a second periodic beacon from a second node in the network;
    determining a first alternate transmission time for the second node to transmit the second periodic beacon based on a second transmission time of the second periodic beacon by the second node and a position of the second node in the network;
    calculating a second listening window to receive the second periodic beacon from the second node at the first alternate transmission time; and listening for the second periodic beacon during the second listening window.

12. The one or more non-transitory computer readable media of claim 11, wherein the instructions further cause the one or more processors to perform the steps of:
   detecting a second scheduling conflict between a third transmission time of a third periodic beacon by the first node and a fourth transmission time of a fourth periodic beacon by the second node;
   determining a second alternate transmission time for the first node to transmit the third periodic beacon based on the third transmission time;
   transmitting the third periodic beacon at the third transmission time; and
   transmitting an alternate beacon at the second alternate transmission time.

13. The one or more non-transitory computer readable media of claim 12, wherein detecting the second scheduling conflict comprises determining that an interval between the third transmission time and the fourth transmission time does not exceed a sum of a first time uncertainty included in a third listening window associated with receiving the third periodic beacon from the first node and a second time uncertainty included in a fourth listening window associated with receiving the fourth periodic beacon from the second node.

14. The one or more non-transitory computer readable media of claim 11, wherein detecting the first scheduling conflict comprises determining that an interval between the first transmission time and the second transmission time does not exceed a sum of a time uncertainty included in the first listening window and an overhead factor.

15. The one or more non-transitory computer readable media of claim 11, wherein determining the first alternate transmission time comprises:
   calculating a time slot offset based on a hop count from the second node to a root node in the network, wherein the hop count represents the position of the second node in the network; and
   adding the time slot offset to a time slot number corresponding to the second transmission time.

16. The one or more non-transitory computer readable media of claim 11, wherein the instructions further cause the one or more processors to perform the steps of:
   detecting a second scheduling conflict between a third listening window for receiving a third periodic beacon from a third node and a fourth listening window for receiving a fourth periodic beacon from a fourth node;
   selecting, from the third node and the fourth node, a node with an older periodic beacon receive time; and
   listening for a periodic beacon from the node during a corresponding listening window.

17. The one or more non-transitory computer readable media of claim 16, wherein detecting the second scheduling conflict comprises determining that an interval between a third transmission time associated with the third periodic beacon and a fourth transmission time associated with the fourth periodic beacon does not exceed a threshold amount of time that is based on a first time uncertainty included in the third listening window, a second time uncertainty included in the fourth listening window, and an overhead factor.

18. The one or more non-transitory computer readable media of claim 11, further comprising estimating the second transmission time based on a network time included in a previous periodic beacon from the second node and a receive time of the previous periodic beacon.

19. The one or more non-transitory computer readable media of claim 11, wherein listening for the second periodic beacon comprises:
   receiving a preamble and a start frame delimiter for the second periodic beacon during the second listening window; and
   listening for a frame included in the second periodic beacon after the second listening window has lapsed.

20. A system, comprising:
   a first node in a network, the first node comprising:
      a memory that stores instructions, and
      a processor that is coupled to the memory and, when executing the instructions, is configured to:
         detect a first scheduling conflict between a first transmission time associated with a first periodic beacon from the first node and a first listening window associated with receiving a second periodic beacon from a second node in the network;
         determine a first alternate transmission time for the second node to transmit the second periodic beacon based on a second transmission time of the second periodic beacon by the second node and a position of the second node in the network;
         calculate a second listening window to receive the second periodic beacon from the second node at the first alternate transmission time; and
         listen for the second periodic beacon during the second listening window.

* * * * *